US010579237B2

(12) United States Patent
Hatfield et al.

(10) Patent No.: US 10,579,237 B2
(45) Date of Patent: Mar. 3, 2020

(54) GUIDE OBJECTS FOR DRAWING IN USER INTERFACES

(71) Applicant: Microsoft Technology Licensing, LLC, Redmond, WA (US)

(72) Inventors: Tucker Hatfield, Kirkland, WA (US); Tyler R. Adams, Seattle, WA (US); Daniel Yancy Parish, Seattle, WA (US); Emily Tran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/197,299

(22) Filed: Jun. 29, 2016

(65) Prior Publication Data

US 2017/0285919 A1  Oct. 5, 2017

Related U.S. Application Data

(60) Provisional application No. 62/314,967, filed on Mar. 29, 2016.

(51) Int. Cl.
*G06F 3/048* (2013.01)
*G06F 3/0484* (2013.01)
(Continued)

(52) U.S. Cl.
CPC ...... *G06F 3/04845* (2013.01); *G06F 3/03545* (2013.01); *G06F 3/04883* (2013.01);
(Continued)

(58) Field of Classification Search
CPC ........ G06T 11/20; G06T 11/203; G06F 3/041; G06F 3/04883; G06F 2203/04808
See application file for complete search history.

(56) References Cited

U.S. PATENT DOCUMENTS 6,377,240 B1  4/2002  Baudel et al.
7,529,773 B2  5/2009  Rogers
(Continued)

FOREIGN PATENT DOCUMENTS

WO      2013054155 A1    4/2013

OTHER PUBLICATIONS

"International Search Report and Written Opinion Issued in PCT Application No. PCT/US2017/023934", dated Jun. 21, 2017, 12 Pages.
(Continued)

*Primary Examiner* — Haoshian Shih

(57) ABSTRACT

Systems, methods, and software are disclosed herein that enhance drawing technology in application user interfaces. In an implementation, a guide object is disclosed herein that allows a user to draw against the guide object, position other objects against, and otherwise interact with the guide object as-if it were a stencil. The guide object may be presented as a drawing tool in a user interface to an application that a user may invoke by user input to assist with the creation of content on a canvas. As a line is drawn proximate to the guide object, for example, or as a shape is positioned nearby the guide object, the application obtains guidance information from the guide object that allows the application to render the interaction between line or shape and the guide object as-if it were an actual stencil.

20 Claims, 22 Drawing Sheets

(51) Int. Cl.
*G06F 3/0354* (2013.01)
*G06F 3/0488* (2013.01)
*G06T 11/20* (2006.01)
*G06T 3/00* (2006.01)

(52) U.S. Cl.
CPC .......... *G06T 3/0068* (2013.01); *G06T 11/203* (2013.01); *G06F 2203/04808* (2013.01)

(56) References Cited

U.S. PATENT DOCUMENTS

| | | | |
|---|---|---|---|
| 7,545,392 | B2 | 6/2009 | Sprang et al. |
| 8,300,062 | B2 | 10/2012 | Tsang et al. |
| 8,427,434 | B1 | 4/2013 | Merolla |
| 8,739,068 | B2 | 5/2014 | Albertson |
| 8,896,621 | B1 | 11/2014 | Sipher et al. |
| 9,164,777 | B2 | 10/2015 | Prasad et al. |
| 2004/0001627 | A1 | 1/2004 | Simmons et al. |
| 2004/0250205 | A1 | 12/2004 | Conning |
| 2010/0274743 | A1 | 10/2010 | Zhang |
| 2010/0295796 | A1 | 11/2010 | Roberts et al. |
| 2011/0175821 | A1* | 7/2011 | King ............... G06F 3/04883 345/173 |
| 2013/0127867 | A1* | 5/2013 | Tijssen ............ G06T 11/203 345/441 |
| 2013/0127910 | A1 | 5/2013 | Tijssen et al. |
| 2013/0268854 | A1 | 10/2013 | Altin et al. |
| 2013/0321350 | A1 | 12/2013 | Mesaros et al. |
| 2014/0088926 | A1 | 3/2014 | Rhoades et al. |
| 2014/0340339 | A1 | 11/2014 | Jung et al. |
| 2015/0009162 | A1 | 1/2015 | Jung et al. |
| 2015/0029194 | A1 | 1/2015 | Ruble |
| 2016/0054893 | A1 | 2/2016 | Dowd et al. |
| 2016/0085583 | A1 | 3/2016 | Goodson |
| 2016/0357430 | A1 | 12/2016 | Migos et al. |
| 2017/0263034 | A1 | 9/2017 | Kenoff et al. |
| 2017/0285920 | A1 | 10/2017 | Hatfield et al. |

OTHER PUBLICATIONS

Binosi, et al., "JaxoDraw: A graphical user interface for drawing Feynman diagrams", In Journal of Computer Physics Communications, vol. 161, Issues 1-2, Aug. 1, 2004, pp. 1-15.

"International Search Report and Written Opinion Issued in PCT Application No. PCT/US2017/023930", dated Jun. 30, 2017, 12 Pages.

"Non Final Office Action Issued in U.S. Appl. No. 15/197,402", dated Aug. 9, 2018, 12 Pages.

"Final Office Action Issued in U.S. Appl. No. 15/197,402", dated Mar. 7, 2019, 11 Pages.

"Advisory Action Issued in U.S. Appl. No. 15/197,402", dated Jul. 1, 2019, 5 Pages.

"Non Final Office Action Issued in U.S. Appl. No. 15/197,402", dated Sep. 5, 2019, 12 Pages.

* cited by examiner

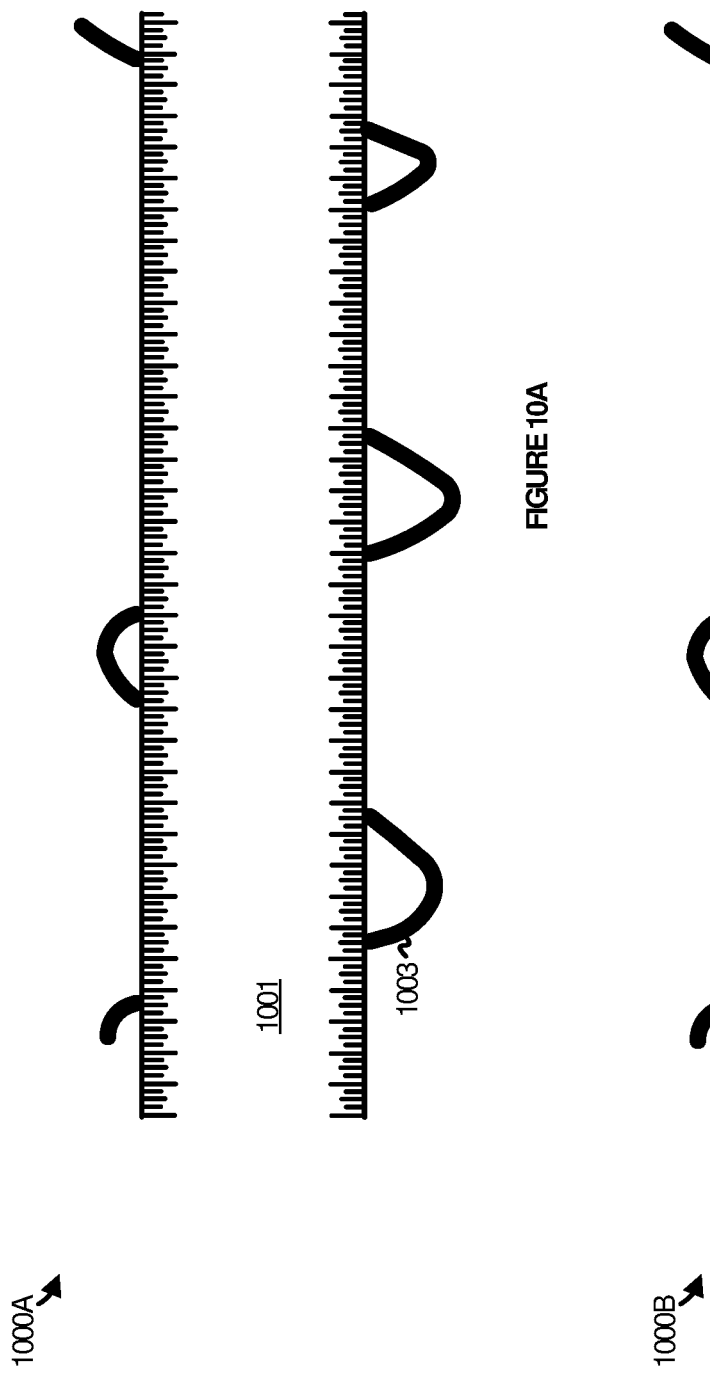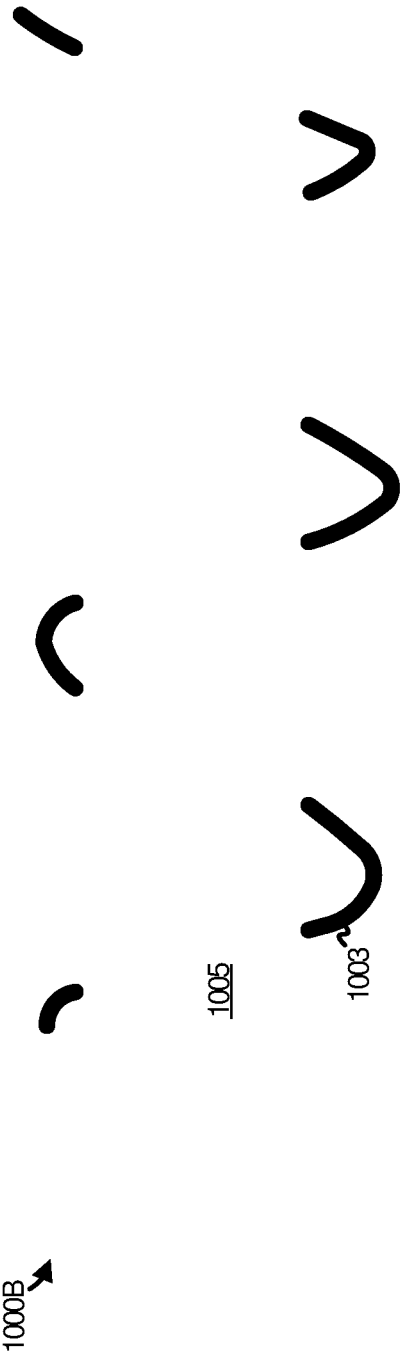

GUIDE OBJECTS FOR DRAWING IN USER INTERFACES

RELATED APPLICATIONS

This application is related to, and claims the benefit of priority to, U.S. Provisional Application No. 62/314,967, filed on Mar. 29, 2016, entitled "Guide Objects for Drawing in User Interfaces," and which is hereby incorporated by reference in its entirety.

TECHNICAL BACKGROUND

A variety of software applications allow users to draw in a user interface to, for example, supplement the main content being produced in an application or even to create the main content. One drawback to drawing in an application has been the difficulty of aligning shapes to each other. For instance, aligning two text boxes to each other in a presentation document or drawing a free form line can be a frustrating experience. Grid snapping, smart guides, and auto-align are some features that have been developed to assist with such tasks, but they all have shortcomings that relegate the user to a sub-optimal experience.

From a technical perspective, grid snapping forces the user to snap an object to a point on a grid, rather than giving the user the freedom to position an object anywhere on a canvas. Smart guides do not allow for snapping at an angle and are relatively slow. Auto-align may align objects with each other, but the user has almost no control over the actual look he or she may be trying to achieve.

OVERVIEW

A guide object is disclosed herein that allows a user to draw against the guide object, position other objects against, and otherwise interact with the guide object as-if it were a stencil. The guide object may be presented as a drawing tool in a user interface to an application that a user may invoke by user input to assist with the creation of content on a canvas. As a line is drawn proximate to the guide object, for example, or as a shape is positioned nearby the guide object, the application obtains guidance information from the guide object that allows the application to render the interaction between line or shape and the guide object as-if it were an actual stencil.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 10A-10B illustrate an operational scenario in an implementation.

TECHNICAL DISCLOSURE

Figure 1:
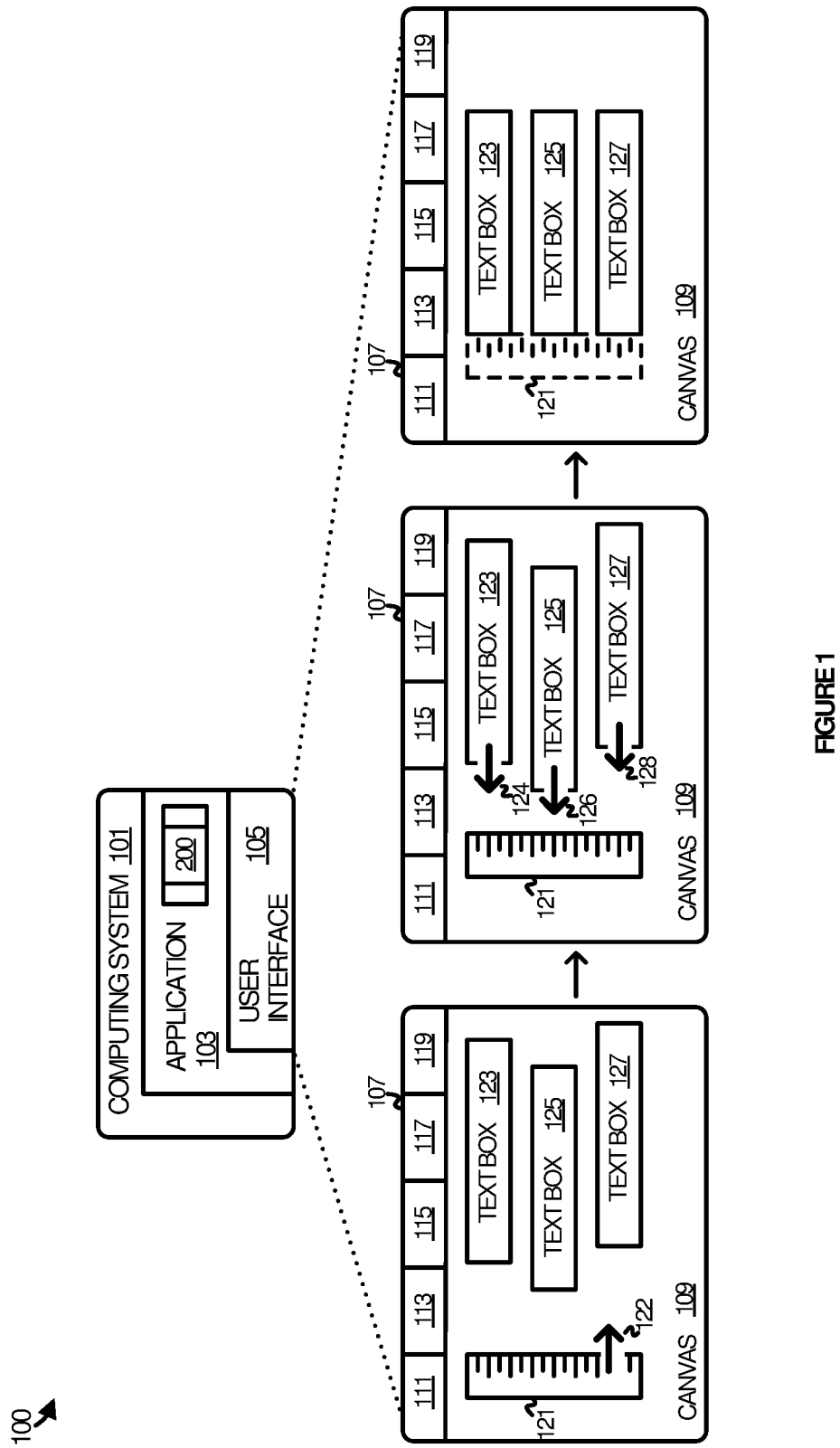
FIG. 1 illustrates an operational scenario in an implementation.

A drawing tool is disclosed herein that allows a user to create content on a canvas in a user interface to an application, as-if the user were working with a stencil. In various implementations, the drawing tool is a guide object that provides guidance to the application as an interaction occurs between the guide object and another object on the canvas. The guidance allows the application to manipulate the object to give the impression that the guide object is a stencil, against which the user may draw lines, position shapes, and otherwise organize their content.

In an implementation, the drawing technology disclosed herein allows users to directly manipulate objects and line them up against arbitrary stencils (straight-edges, curves, etc.) to quickly and easily create polished documents or construct new illustrations. The technology allows for direct manipulation by touch or mouse input of a guide object. Various behaviors are also supported, such as object collision, curved stencil behavior, gravity "snap" zones, rotation (directly moving or advanced rotation handles), and convenient behaviors, such as user interface feedback when two objects are aligned to each other.

FIG. 1 illustrates operational scenario 100 in an implementation of the aforementioned enhanced drawing technology. Operational scenario 100 involves computing system 101, which hosts application 103. Computing system 100 executes application 103 to render user interface 105. User interface 105 includes a feature menu 107 (optional) and a canvas 109. Free form lines, shapes, and other content may be drawn on canvas 109. Feature menu 107 includes various menu elements (represented by menu elements 111-119) that may include a guide tool for guiding the drawing of lines, shapes, and the like.

Figure 2:
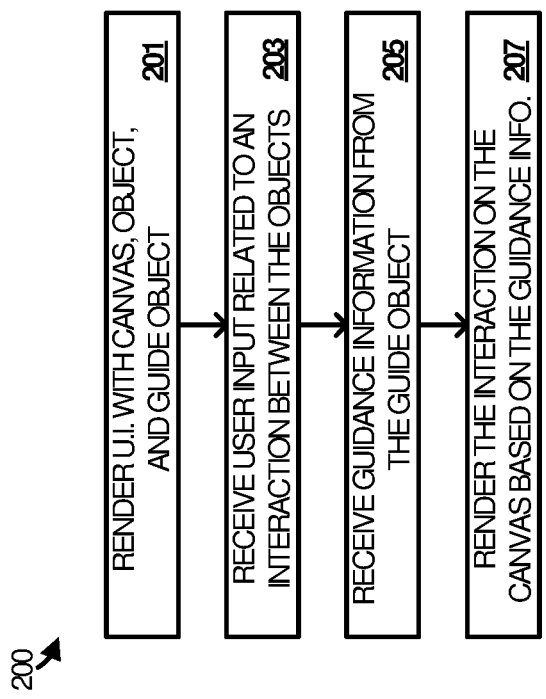
FIG. 2 illustrates a process that may be employed by an application in an implementation of enhanced drawing technology.

Selecting the guide tool surfaces a guide object 121 (or a representation thereof) on canvas 109. It is assumed for exemplary purposes that other objects have already been drawing on canvas 109, but not aligned, represented by text box 123, text box 125, and text box 127. Application 103 employs process 200 in the context of managing interactions between guide object 121 and other objects on the canvas (e.g. text boxes). The following discussion makes parenthetical reference to the steps illustrated in FIG. 2.

In operation, application 103 renders user interface 105, including the canvas 109, the guide object 121, and text boxes 123, 125, and 127 (step 201). User input 122 is provided that moves guide object 121 to a location desired by the user. The user may desire to, for example, position a ruler, protractor, or other such stencil to a new position on canvas 109, against which a line may be drawn or other shapes positioned.

Next, user input is received that relates to an interaction between guide object 121 and one or more of text boxes 123, 125, and 127 (step 203). In this example, user input 124 serves to move text box 123 to the left, to align it with guide object 121; user input 126 moves text box 125; and user input 128 moves text box 127.

As the text boxes are moved, application 103 (or a component thereof) receives guidance information from guide object 121 that relates to the interaction or interactions associated with the user input (step 207). Application 103 renders the interaction or interactions based on the guidance information (step 209). The guidance information may include a location of the guide object 121 on the canvas, informing the application 103 of where it is, so that the application 103 can evaluate how to render an interaction. For example, application 103 may render an object collision between the text boxes and guide object 121 when they become adjacent to each other. In another example, application 103 may shift the rotation point within an object from its center to a point on the edge of the object that collides with the guide object (thereby allowing it to rotate against the guide object). In this manner, all three text boxes may be aligned with each other, by virtue of having been aligned with the guide object. In other examples, other shapes may be aligned with the outside, curved edge of a protractor stencil.

Figure 3:
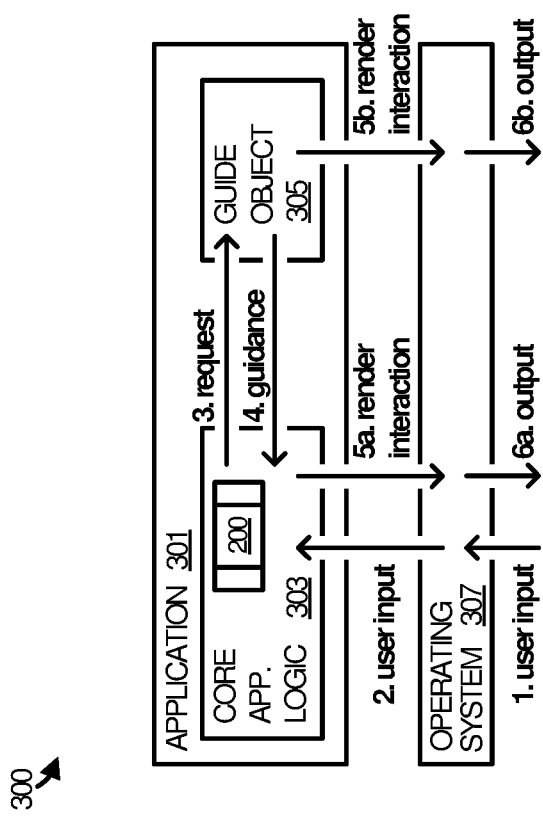
FIG. 3 illustrates a software environment that may support enhanced drawing technology in an implementation.

FIG. 3 illustrates an operational environment 300 for implementing the enhanced drawing technology disclosed herein. Operational environment 300 includes application 301 and operating system 307. Application 301 includes core application logic 303 and guide object 305.

In operation, core application logic 303 employs process 200 to manage interactions between guide object 305 and other objects that application 303 may render. Operating system 307 receives user input when a user touches on screen or provides pen input. The user input is communicated to application 303, which can then respond accordingly.

When another object is touched, drawn, or otherwise manipulated, core application logic 303 requests guidance information from guide object 305. Guide object 305 replies with the guidance information, such as its location on a canvas, which core application logic 303 may factor into its rendering of the subject object and/or its interaction with guide object 305 on-screen. Core application logic 303 communicates with operating system 307 to render the interaction on-screen, in the form of visual output, haptic feedback, or the like.

In some optional scenarios, guide object 305 may itself communicate with operating system 307 to render the interaction. For example, when a user draws a free-form line against an edge of guide object 305 (or its graphical representation on-screen), guide object 305 may be capable of communicating with operating system 307 to change the inking points, so that they precisely align with the edge of the guide object.

Figure 4:
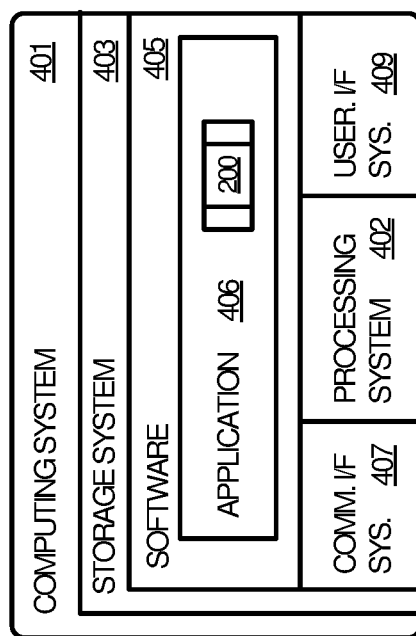
FIG. 4 illustrates a computing system suitable for implementing the enhanced drawing technology disclosed herein, including any of the applications, architectures, elements, processes, and operational scenarios and sequences illustrated herein.

FIG. 4 illustrates computing system 401, which is representative of any system or collection of systems in which the various applications, services, scenarios, and processes disclosed herein may be implemented. Examples of computing system 401 include, but are not limited to, smart phones, laptop computers, tablet computers, desktop computers, hybrid computers, gaming machines, virtual reality devices, smart televisions, smart watches and other wearable devices, as well as any variation or combination thereof. Other examples, may include server computers, rack servers, web servers, cloud computing platforms, and data center equipment, as well as any other type of physical or virtual server machine, container, and any variation or combination thereof. A more detailed discussion of FIG. 4 may be found below after the discussion of FIGS. 17A-17B.

The following discusses an implementation of enhanced drawing technology using multi-modal support in productivity applications, which enables inking against a ruler and other stencils in productivity applications. Measuring with a ruler and aligning and/or/distributing shapes with a stencil may also be supported.

An ink input liblet with ink input control APIs may be utilized. The ink input liblet intercepts ink points and maps them to a stencil, if a stencil is present and if the ink points are within a threshold distance. This distance may be calculated using guidance information provided by the stencil (e.g. location information).

Various input gestures may be supported with respect to interacting with stencils on a touch services: for example, a two finger press and hold for invoking stencils, and a two finger rotation for rotating stencils.

In an example of the two finger press and hold in PowerPoint®, gesture handling for desktop PowerPoint® may be performed in OART and the shared touch framework. The Art::ViewDefaultTouchable class will detect pans and flicks on the slide and in those cases release control over pointers on AirSpace::IPointerInputSources, which will result in DirectManipulation taking over. Detection for the gesture will involve checking that the count of pointers is 2 and waiting a time interval to see that a zoom or pan was not actually initiated.

A stencil may be a drawing tool in some implementations, such as a ruler, protractor or a French curve. Users can use digital stencils as aids for precise inking and for other purposes such as measurement and aligning and distributing shapes. Two features support inking against stencils.

Ink Input Control. This enables an app to drive and/or manipulate input received by InkPresenter. In Threshold, an app could cancel the rendering of an ink stroke already in progress, but that was the only control it had. In an advance, apps will be able to manipulate wet ink in real time through a synchronous callback. Apps may also support simultaneous ink and touch input, handling simultaneous pen and touch input, making manipulation of a stencil possible with one hand while inking with the other. This may also be supported by fast input switching.

Some implementations may involve a single stencil, e.g. a ruler, that is rendered onto an AirSpace layer which hosting applications create and insert into their AirSpace layer tree. The ruler will be part of a new stencil liblet that can be used cross-platform by Office apps.

A stencil can be invoked either using two finger touch and hold or through a control in the ribbon. When invoked from the ribbon, the ruler will be placed in its most recent location, and remain visible until dismissed. When invoked through the two finger gesture, the ruler's location will be based on the location of the gesture. When invoked with the two finger gesture, the ruler will be visible until the user lifts up all fingers.

If the InkPresenter is configured for finger painting then all touch input will go to the InkPresenter on the ink background thread, which will need to handle the gesture and stencil invocation. If the user is not inking or inking with a pen, then the gesture will go to the app, which will invoke the stencil by setting the position of the layer and making it visible. Two finger press and hold will be ignored if the ruler was already invoked through the ribbon.

The stencils will be rendered using AirSpace and ARC in order to draw upon the AirSpace layer provided by the apps.

Figure 5:
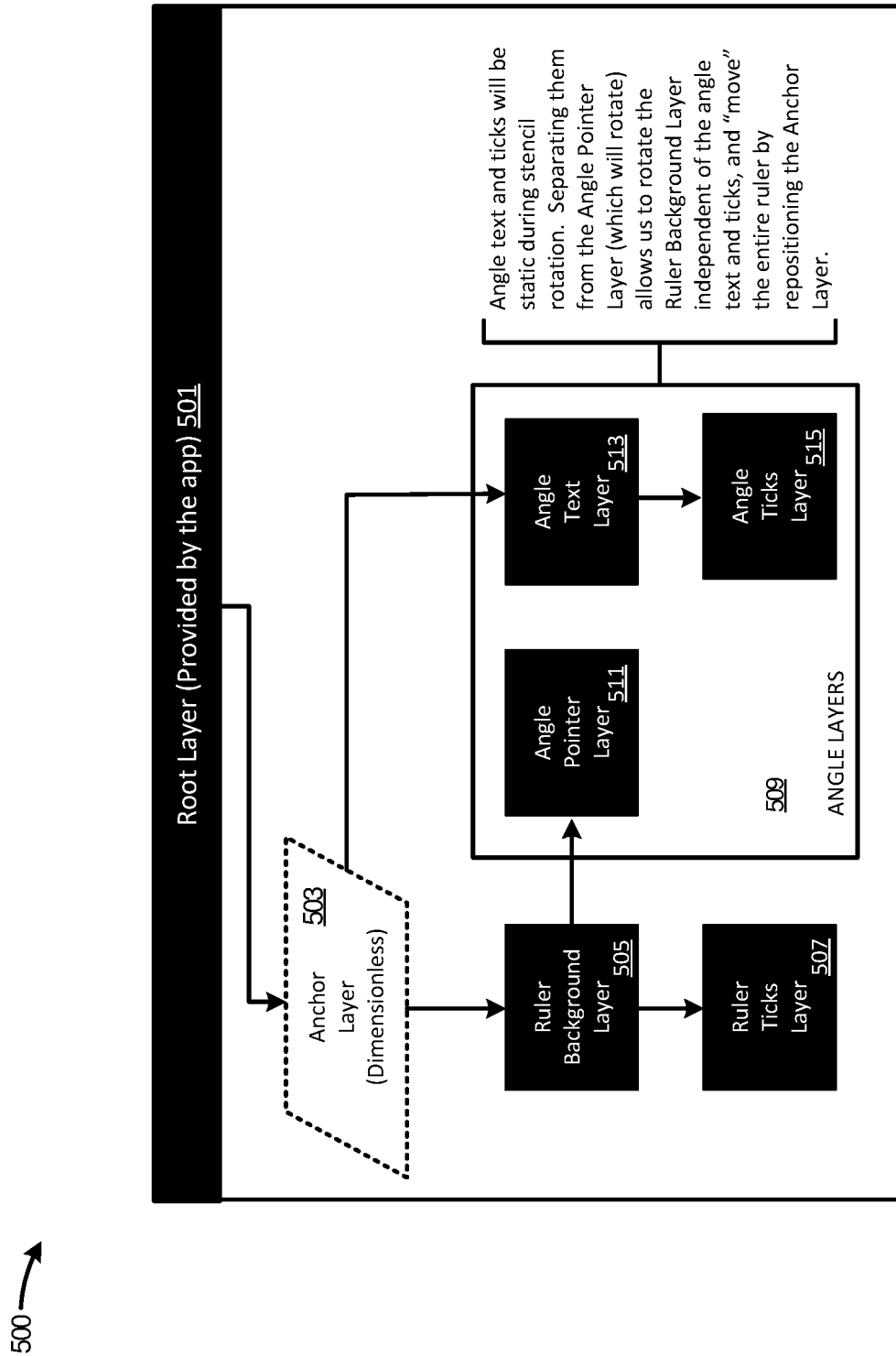
FIG. 5 illustrates a layer hierarchy in an implementation of enhanced drawing technology.

FIG. 5 illustrates a layer hierarchy 500 in an example of the AirSpace layer tree and AirSpace layer hierarchy for the ruler stencil.

Layer hierarchy 500 includes a root layer 501, which is provided by the application in which a ruler stencil is implemented. An anchor layer 503 sits below the root layer 501 and is dimensionless. Below the anchor layer 503 is a ruler background layer 505, and below it is a ruler ticks layer 507. Various angle layers 509 also sit below the anchor layer 503. The angle layers 509 include an angle pointer layer 511, an angle text layer 513, and an angle ticks layer 515.

Stencils will be rendered onto an AirSpace layer. The layer will be placed above the scrolling layer so that users can zoom in the canvas without zooming stencils and thus draw with more precision.

Ink input will always go to the InkPresenter. If the InkPresenter is configured for finger painting then touch input will go to the InkPresenter as well, otherwise it will be sent to the host app. InkPresenter is not in the AirSpace tree in either Win32 or WinRT and thus the AirSpace Stencil layer cannot sit above InkPresenter to capture input and prevent it from passing through to InkPresenter. CoreInkIndependentInputSource will be used to intercept input going to the InkPresenter, hit test the stencil, and steal the input if the stencil is hit or pass the input to InkPresenter to draw.

This solution enables the ruler to be placed in the AirSpace tree on all platforms with no platform specific special case AirSpace logic/tree management. The stencil will work the same on all platforms.

As a result, stencils will require special input handling logic. Also, when the stencil is visible, a hit-test will be performed in the InkPresenter's input event handler. This could impact latency on drawing ink. However, in custom stencil scenarios, all ink points will be received and hit-tested against the ruler anyway before they are drawn to determine if they should be modified.

As a possible performance issue mitigation strategy, AirSpace has a concept of SharedLayers which would allow manipulation of layer properties on the thread within which the input was received. In some cases, these shared handles can be created across threads in order to reduce the amount of IPC required. However, there are some limitations on the InkPresenter thread that might negate this benefit in the pen inking scenarios.

Office productivity applications use DirectInk for ink input and rendering. In Threshold, ink input goes directly to the InkPresenter and consumers (of InkPresenter) have no way to preprocess ink input events in order to modify wet ink appearance. In an implementation, an Ink Input Control will enable manipulation of wet ink paths in real time using a synchronous callback on the ink background thread. An application will use this callback to modify wet ink points when users ink against a stencil.

In both finger painting and pen drawing mode, pen/finger movement (or initial pressing event) will be sent to CoreInkIndependentInputSource::PointerMoving( ) (or PointerPressing( )) handler before wet ink is drawn. Next, the application performs hit-testing on the pointer location to see whether it is (1) inside a stencil (2) inside a stencil's gravity zone or (3) neither.

If hit-test is within the boundaries of the stencil when in pen drawing mode, PointerMoving handler will return Handled to cancel the current stroke since the application will not ink on a ruler. (In finger painting mode, a different operation discussed below is performed.) If hit-testing is within stencil's gravity zone, the application will use DirectInk's new CoreWetStrokeInputSource API to modify ink points to go along with the ruler edge (e.g draw a straight edge). If none of the above, wet ink will be drawn as usual.

In some implementations, stencil manipulation is done using touch, as a stylus cannot manipulate stencils. In pen mode, touch events will go to the application first, so stencil manipulation is handled directly from on the application thread using AirSpace shared layers (explained below). In finger painting mode, CoreInkIndependentInputSource's PointerMoving will get the manipulation fingers' event first, and then hit-testing is performed. If one finger is on stencil, then stencil translation is performed (which sends finger position from ink background thread to UI thread to achieve the translation). If two fingers are on stencil, then stencil translation and rotation is performed (which sends finger positions from ink background thread to UI thread). All other fingers will be treated as drawing fingers, so they will follow the strategy mentioned in the Inking section.

Figure 6:
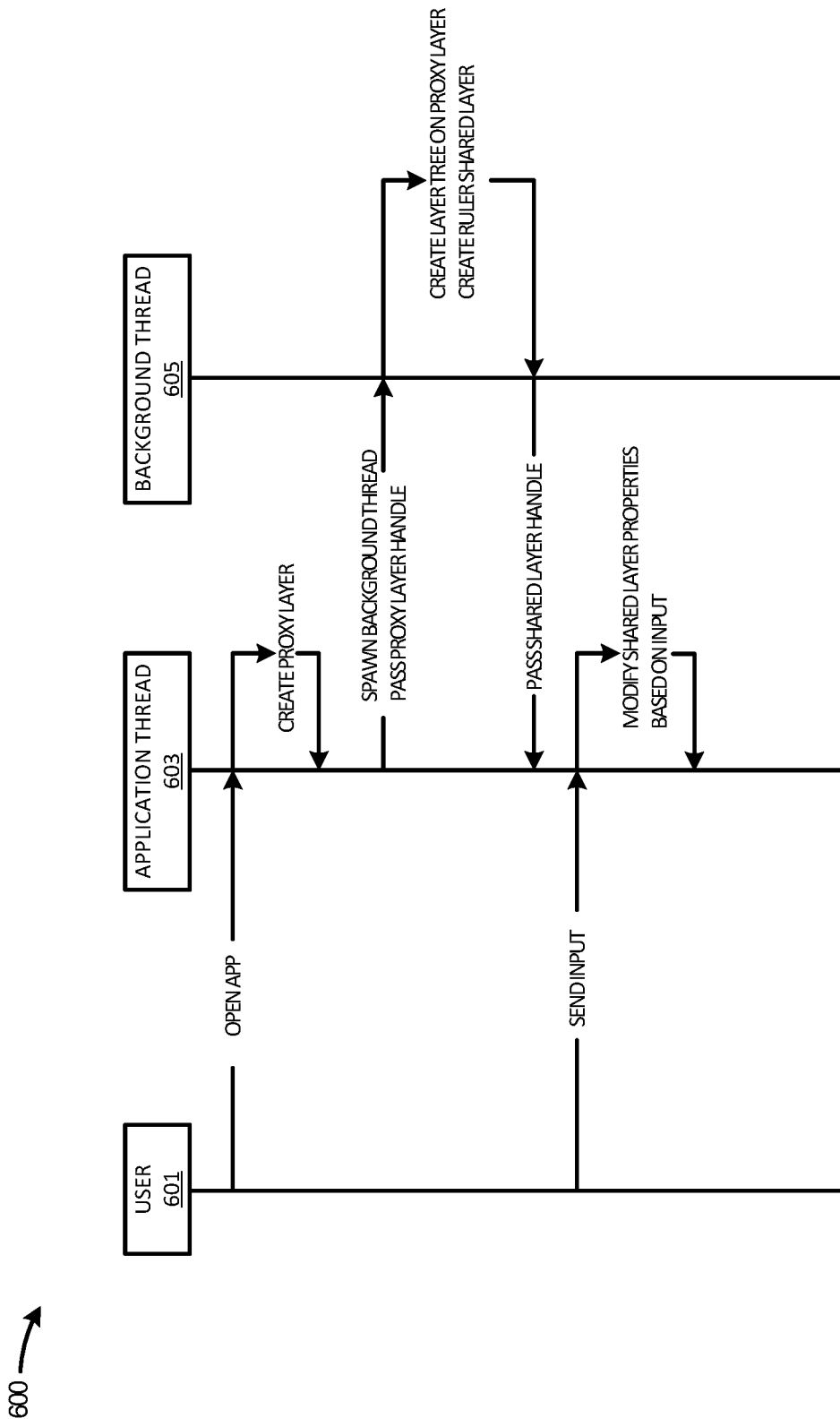
FIG. 6 illustrates a sequence diagram in an implementation.

In cases such as those described in the Stencil manipulation section above, input won't always be received on the same thread. In order to reduce latency from IPC, an application will utilize AirSpace's proxy and shared layers. Proxy layers allow delegate manipulation of an entire layer subtree whereas shared layers allow delegate manipulation of a single layer. The sequence diagram 600 in FIG. 6 illustrates how latency in the pen inking scenario may be mitigated.

In operation, a user 601 opens the application. The application thread 603 creates an AirSpace proxy layer and a background thread 605. The application thread 603 passes the proxy layer to the background thread 605. The background thread 605 creates and renders the layer tree on the proxy layer. The background thread 605 passes a shared layer handle for the stencil layer back to the application thread 603. The application thread 603 receives relevant input and modifies the ruler layer properties with the stored shared layer.

In finger painting mode, stencil manipulation will lag if done on the UI thread. In order to improve this, the application will dispatch the input to a background stencil manipulation thread, and perform manipulation there.

Hit testing may be performed with respect to pen and finger painting input. For each pointerId, hit testing needs to determine whether input is within the stencil, in the stencil's gravity zone or outside the stencil, and calculate the intersection points of the stencil edge and the straight line between current and last input position. There may be zero or more intersection points.

Figure 7:
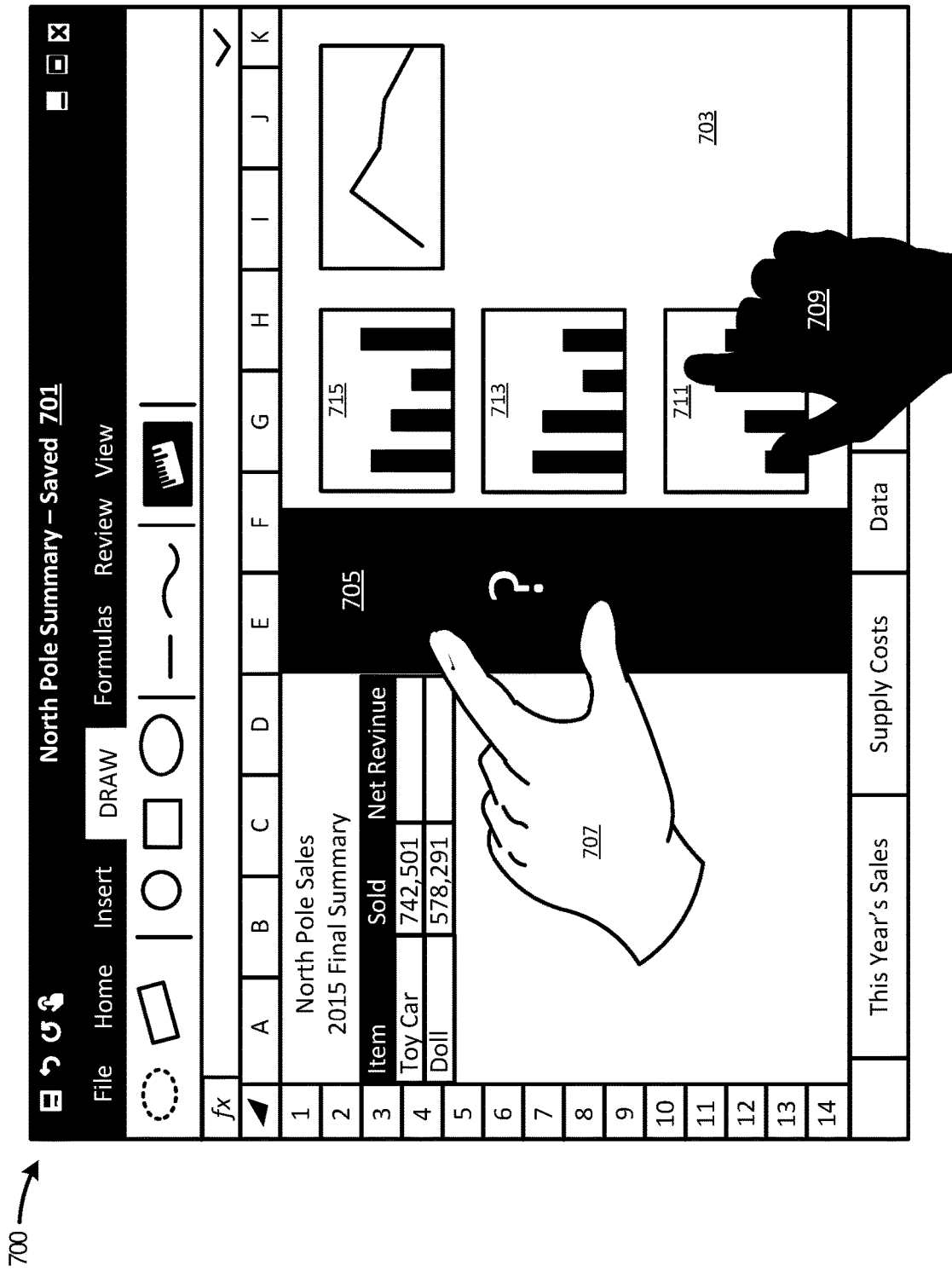
FIG. 7 illustrates a computing device employing enhanced drawing technology in an implementation.

FIG. 7 illustrates a computing device 700 employing enhanced drawing technology in an implementation. Computing device 700 displays a user interface 701 to an application in which enhanced stencils may be supported. In this example, the application is a spreadsheet application, although any type of productivity application is possible, such as word processing application, presentation applications, and the like.

User interface 701 includes a workbook grid 703 (or canvas) into which figures may be entered, charts may be produced, and a variety of other functions and features employed in the context of interacting with a spreadsheet. A stencil 705 may be employed by a user to assist with creating content in the workbook. In this example, stencil 705 is a ruler, although other types of stencils are possible, such as protractors, triangles, or custom stencils.

The user may interact with the stencil 705 by way of various gestures, of which gesture 707 is representative. Gesture 707 is a multi-touch gesture with two fingers touching the stencil. In addition, gesture 709 is provided by the user simultaneously with gesture 707. Gesture 707 may be a non-dominant hand gesture for a right-handed person, while gesture 709 may be a dominant hand gesture for a right-handed person. Although, it may be appreciated that the nomenclature would be reversed for left-handed users. The point being that one gesture is made with one hand, while the other gesture with the other hand. Simultaneous gestures in this context may be understood to be two gestures that overlap for at least some amount of time, although they need not overlap for their entirety.

With two fingers pressed down on stencil 705, the user may move graphic 711 into place against stencil 705 using just one finger. Thus, graphic 711 can be aligned with graphic 713 and graphic 715 by placing all three graphics against the ruler.

Figure 8A:
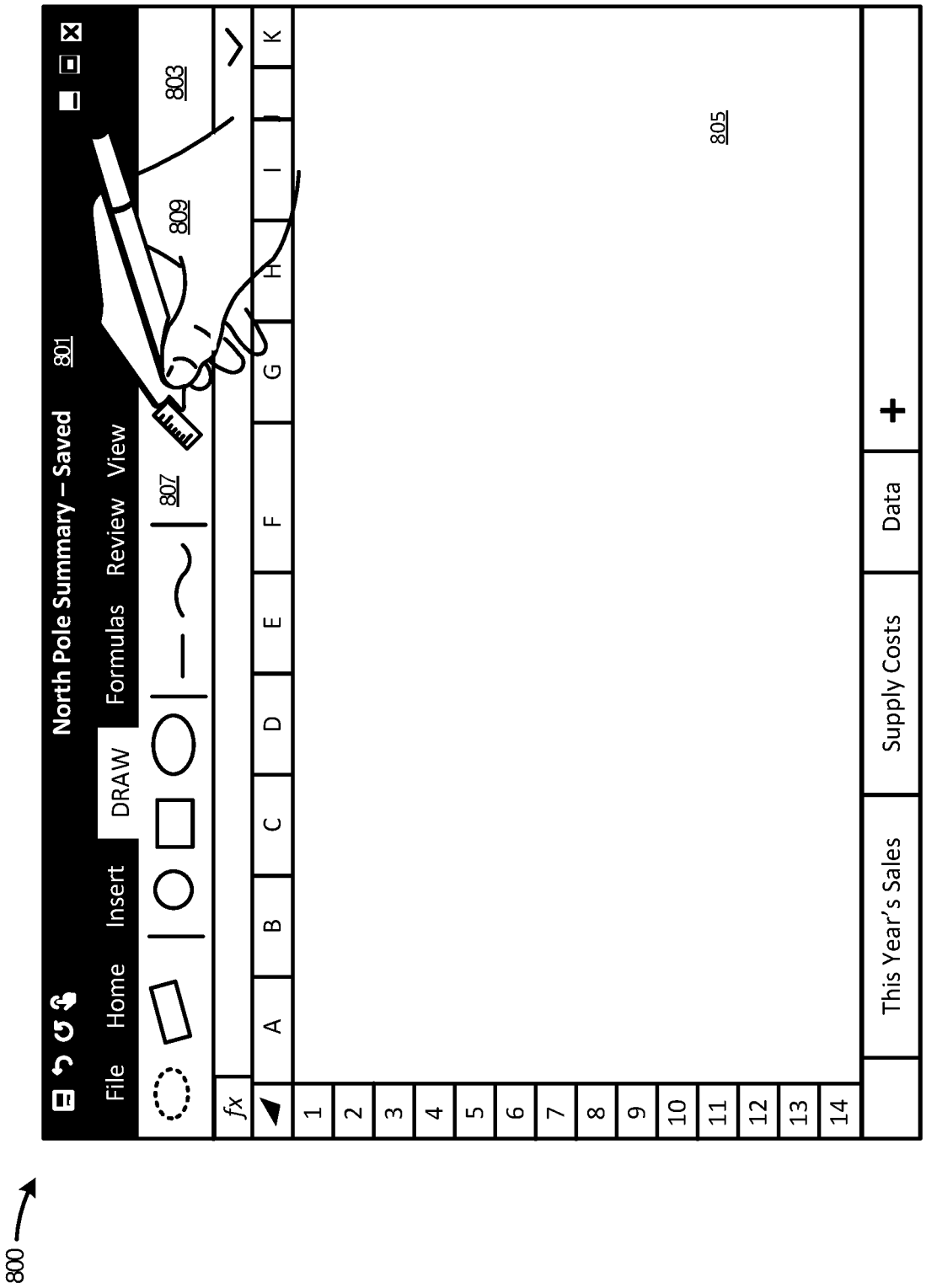
FIGS. 8A-8G illustrate an operational scenario in an implementation.

FIG. 8A illustrates user interface 800 in another, similar example. User interface 800 is a user interface to a spreadsheet application, although the illustrated concepts may be applied to word processing applications, presentation applications, or any other type of productivity application.

User interface 801 includes a feature menu 801 in which various sub-menus are available, including file, home insert, draw, formulas, review, and view sub-menus. The draw sub-menu 803 is selected in this example, under which are various features available through the sub-menu for drawing on canvas 805. The features include a color palette, a line-width feature (to increase or decrease the width of a drawing line), an eraser feature, and a stencil feature 807.

Figure 8B:
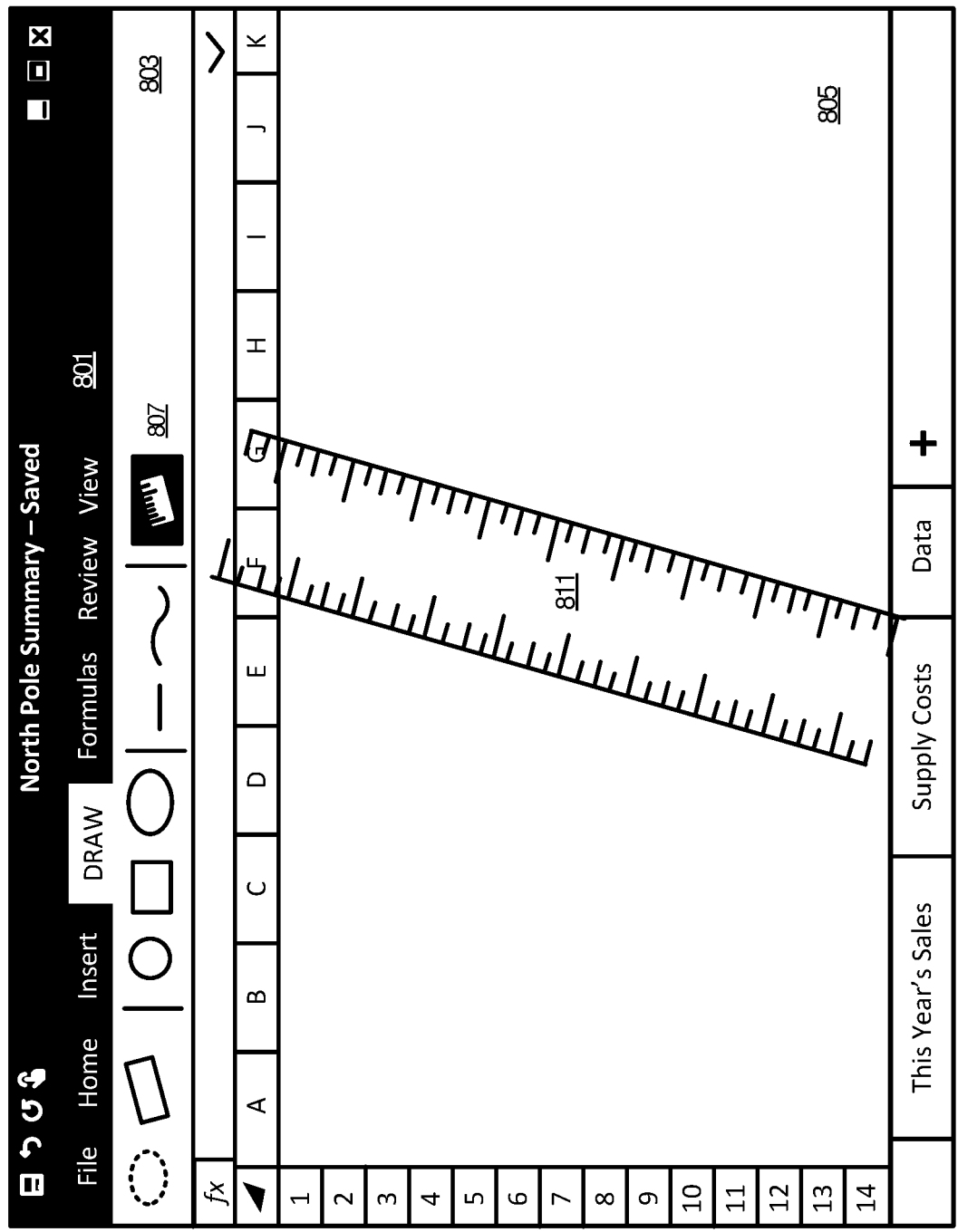
Figure 8C:
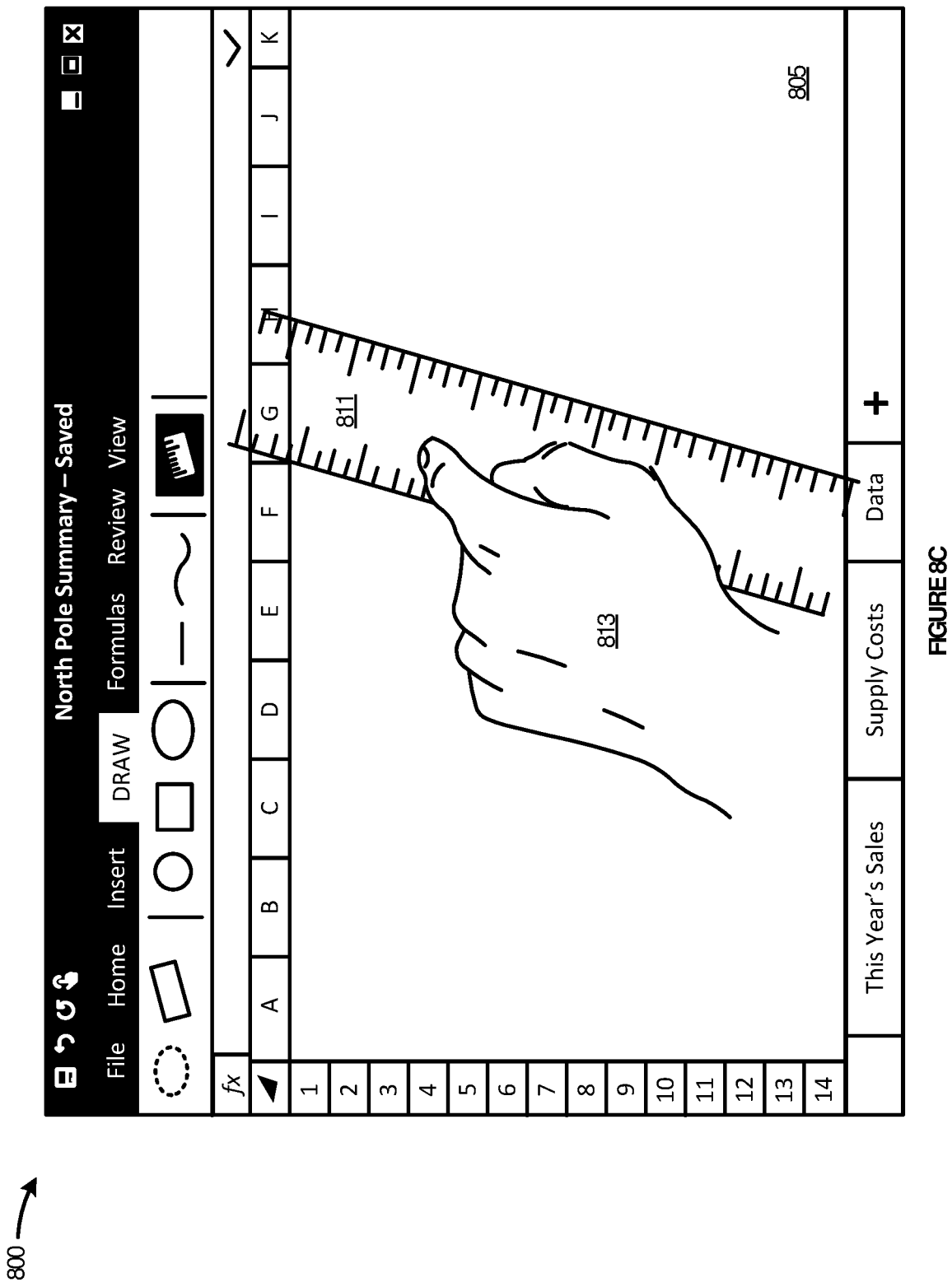

Selecting the stencil feature 807 by way of a user input 809 transitions user interface 801 to include ruler 811 in FIG. 8B. Ruler 811 is representative of a stencil that may be invoked by a user input in the draw sub-menu 803. In FIG. 8C, the user may interact with ruler 811 via user input 813 to move the ruler around canvas 805.

Figure 8D:
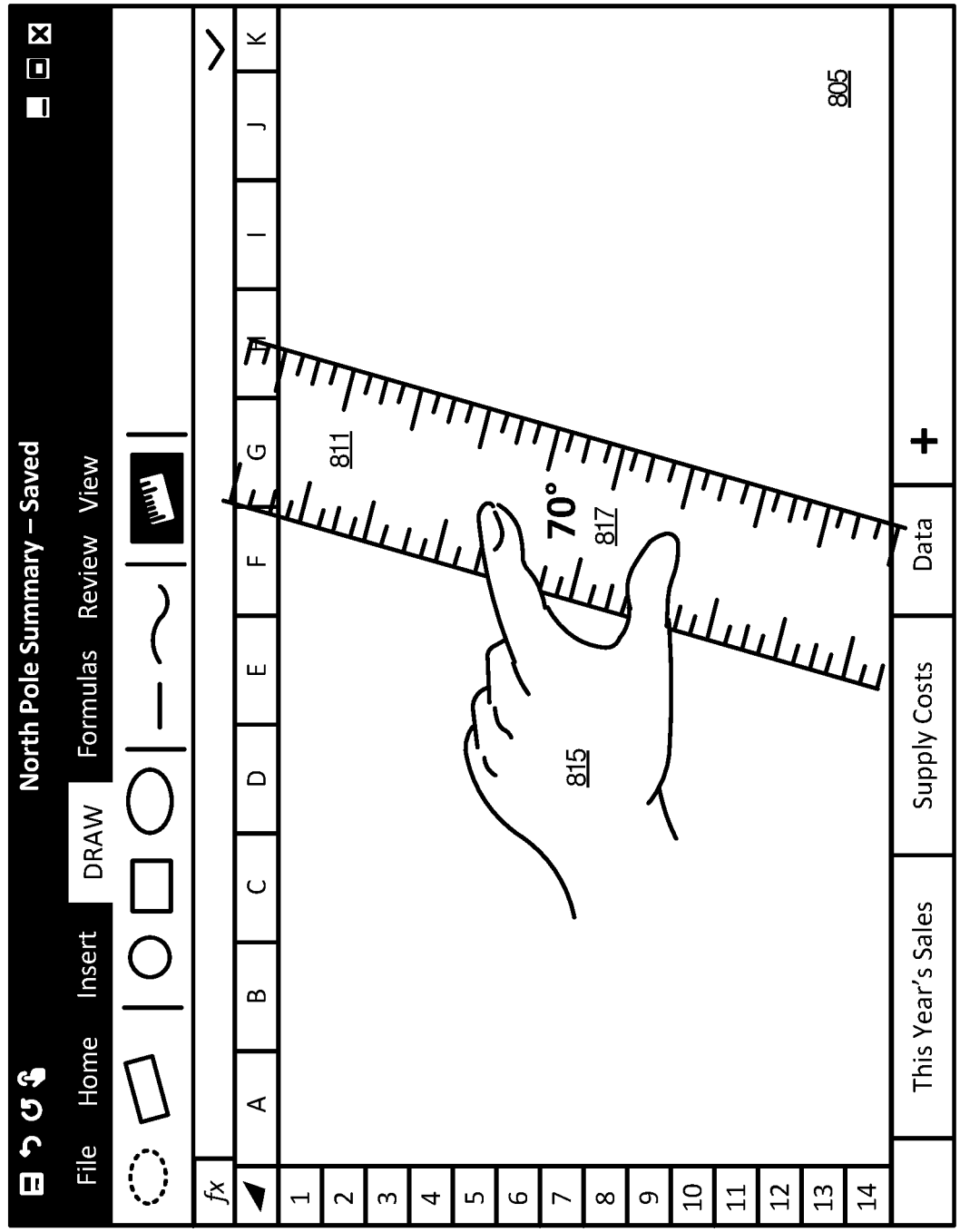

In FIG. 8D, the user may interact with ruler 811 by way of user input 815. The gesture allows the user to lock ruler 811 in place and, in doing so, triggers ruler 811 to surface an indication 817 of its angle with respect to the horizontal.

Figure 8E:
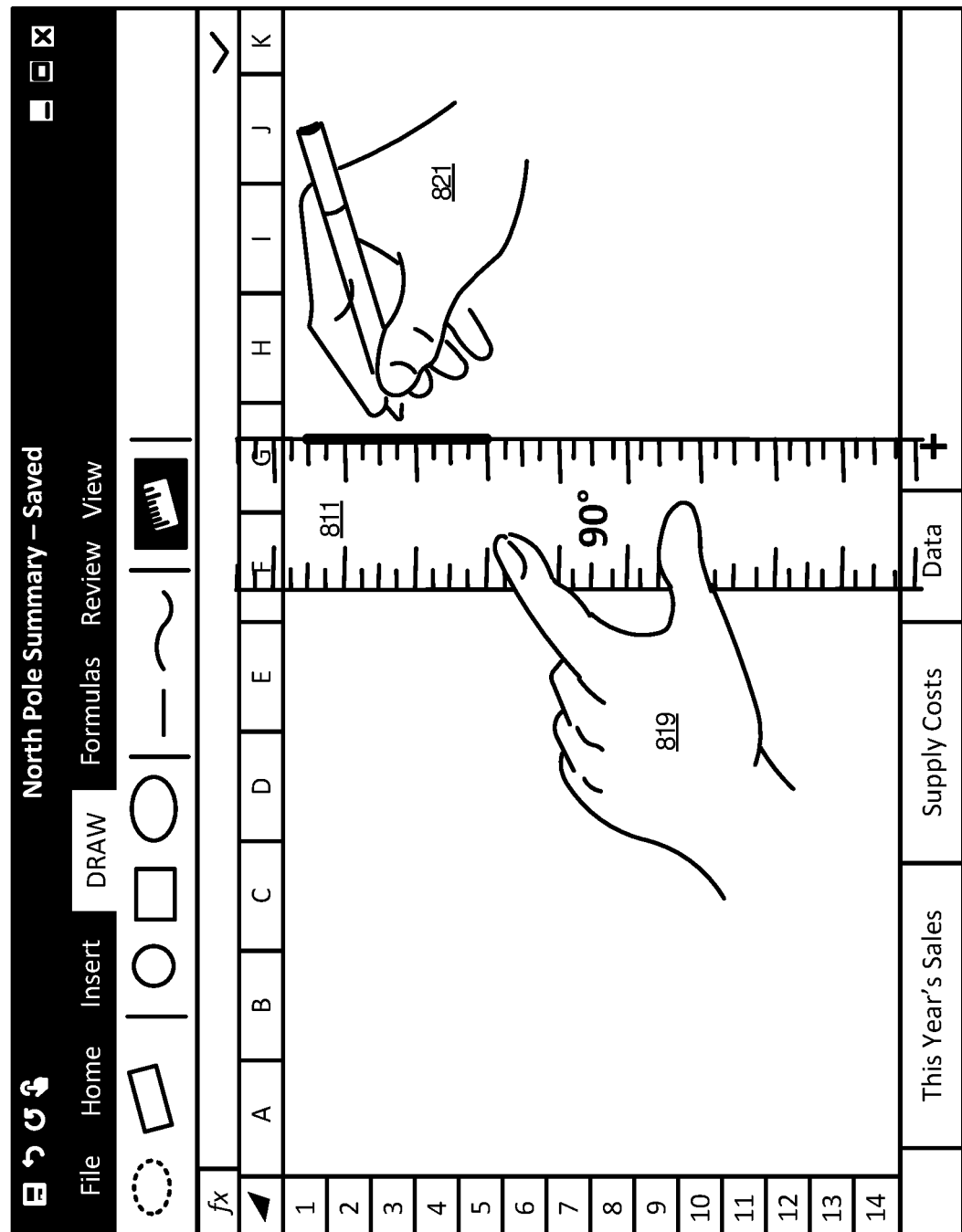

In FIG. 8E, the user supplies user input 819 to rotate ruler 811 to ninety degrees. In addition, the user supplies user input 821 simultaneously with user input 819. User input 819 is represents digital inking with a pen along the edge of ruler 811.

Figure 8F:
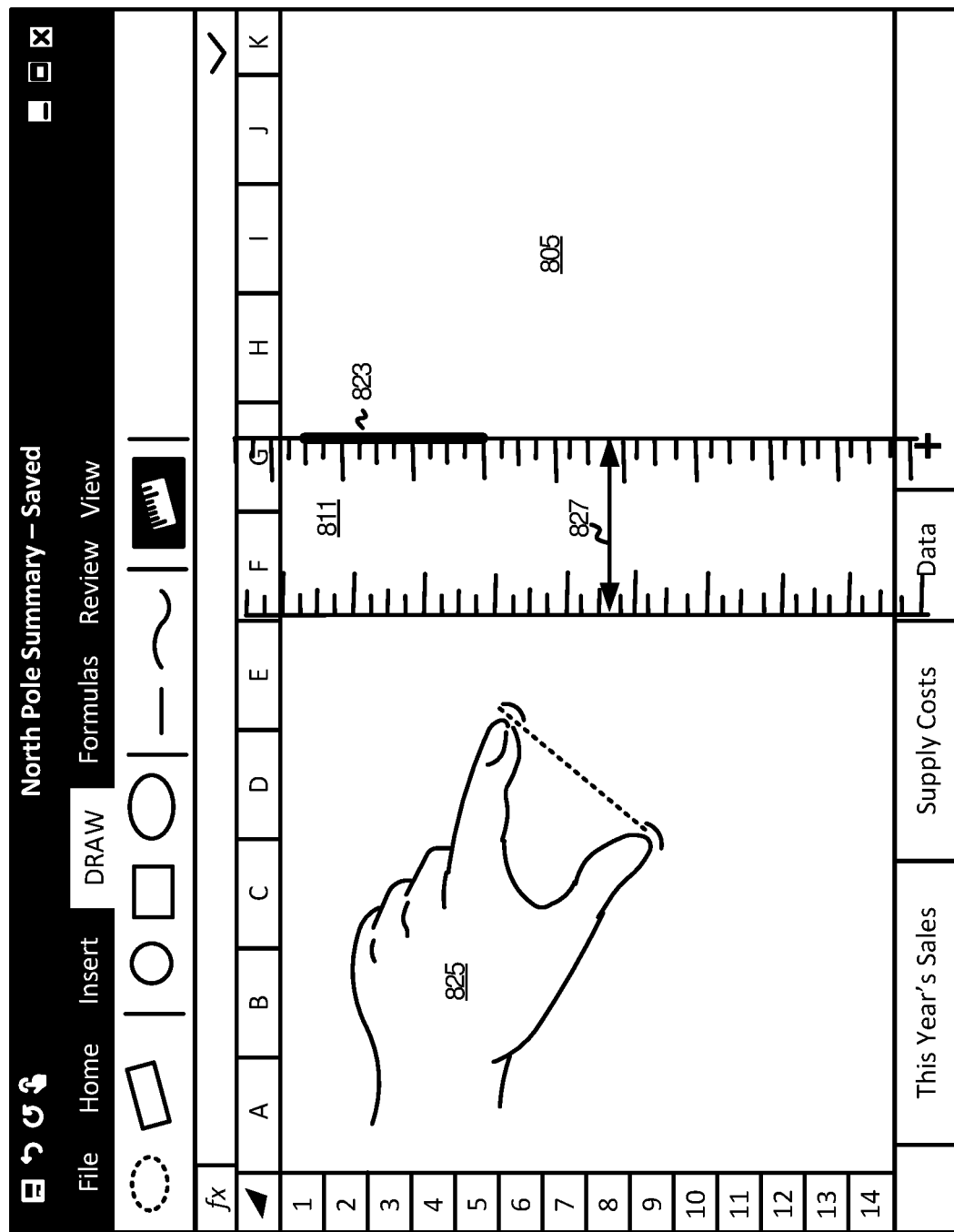
Figure 8G:
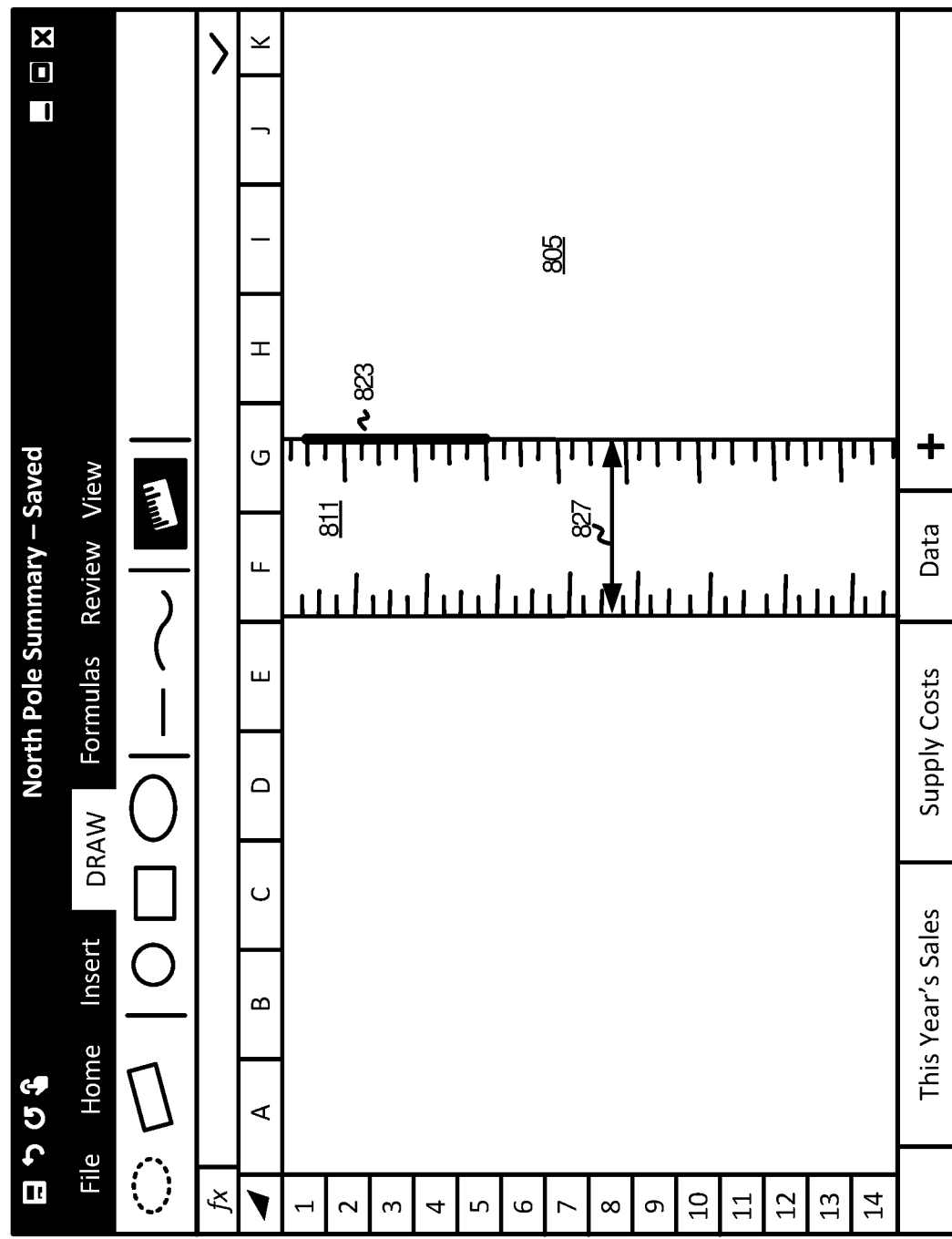

The user may zoom-in to the canvas 805. However, zooming does not increase or decrease the size of ruler 811, although its tick marks do scale. As shown in FIG. 8F, ink line 823 represents line drawn in FIG. 8E. The user provides a zoom-in gesture 825 to zoom into the canvas 805. From FIG. 8F to FIG. 8G, the line becomes longer visually, due to the zoom-in, but the width 827 of ruler 811 does not change.

Figure 9A:
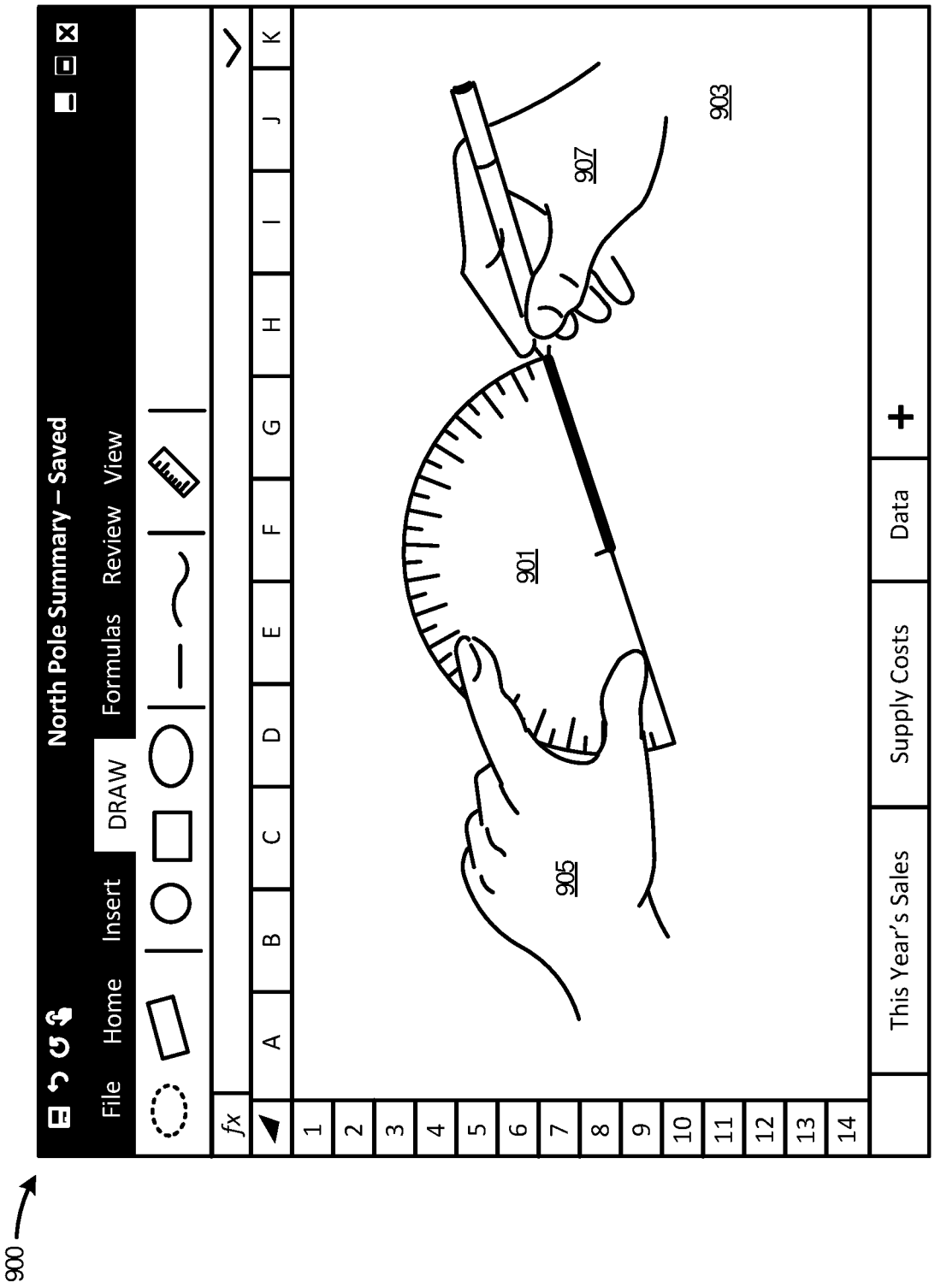
FIGS. 9A-9F illustrate an operational scenario in an implementation.

FIGS. 9A-9F illustrates another operational scenario in an implementation of enhanced drawing tools. In FIG. 9A, a user interface 900 to an application is illustrated. The stencil feature in the drawing sub-menu of the user interface 900 has been selected and a protractor tool chosen. Accordingly, protractor 901 is displayed on canvas 903. A user may interact with protractor 901 in order to align shapes, draw curved (or straight lines), or otherwise draw in free-form on the canvas 903.

In this example, gesture 905 is supplied by the user to hold protractor 901 in place. Gesture 905 is a two-digit gesture with the user's non-dominant hand, assuming the user is right-handed. Such a convention could be reversed if the user is left-handed. The user also supplies pen input 901, touching down a digital pen in canvas 903 along a point on protractor 901.

Figure 9B:
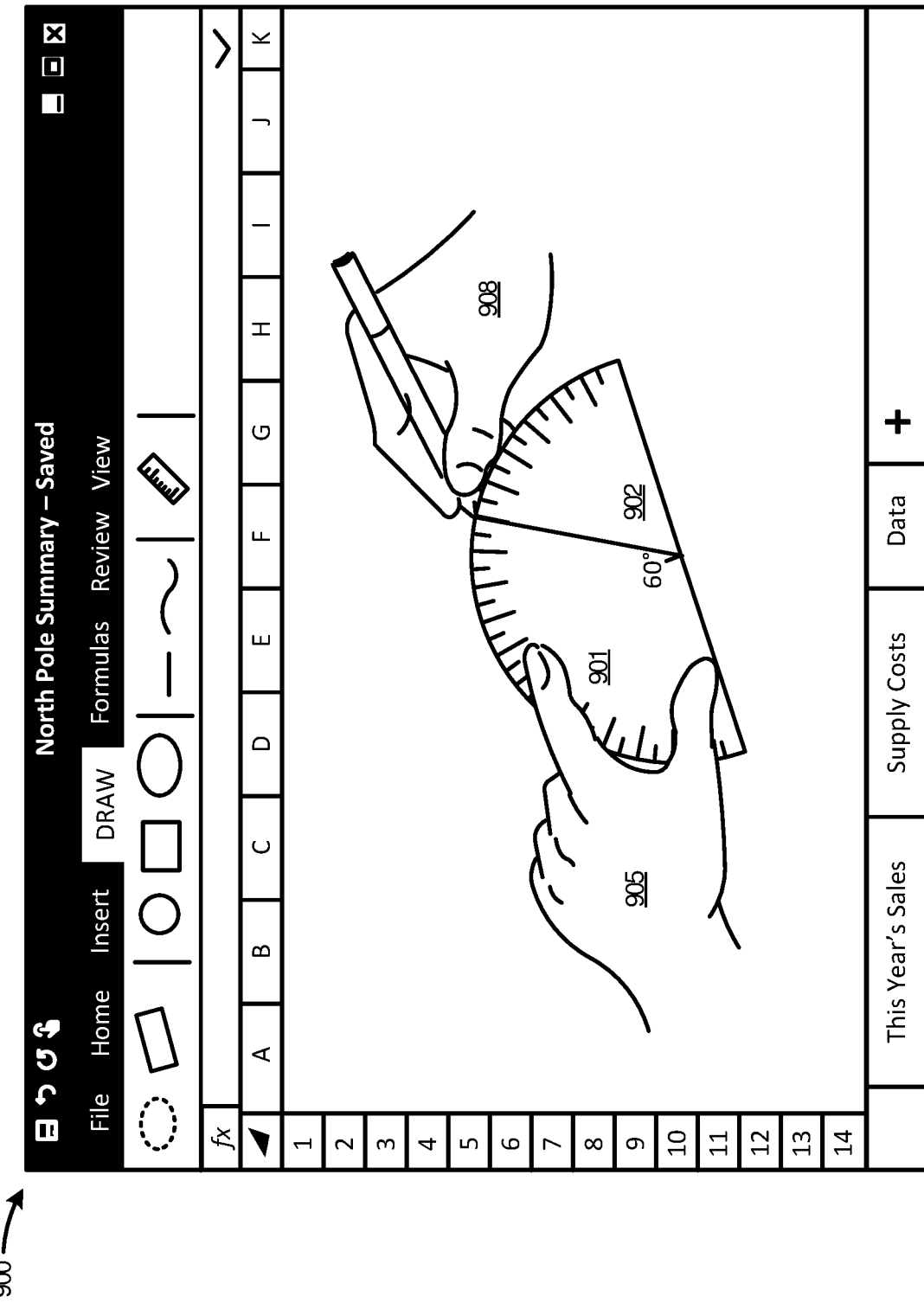
Figure 9C:
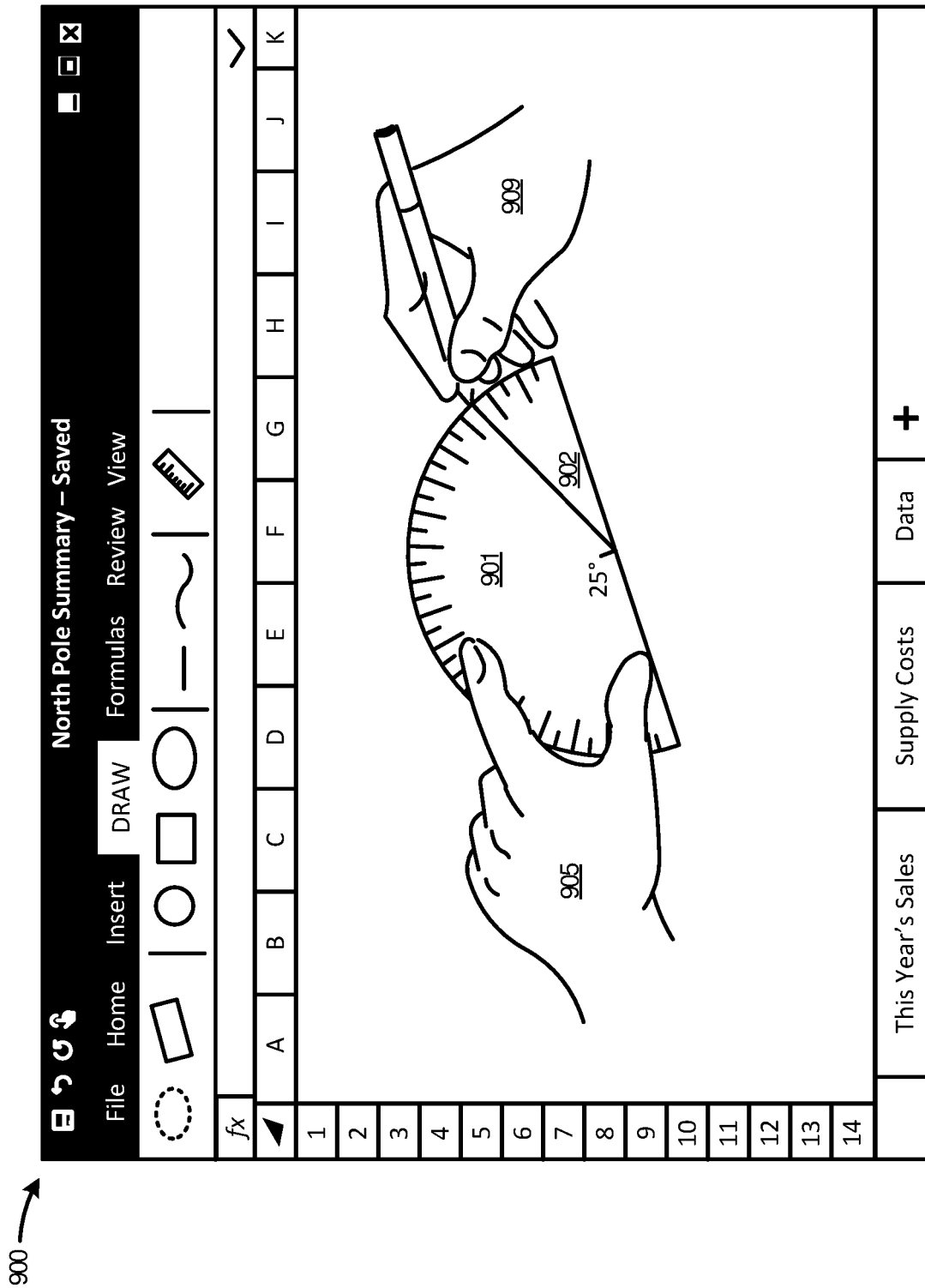
Figure 9D:
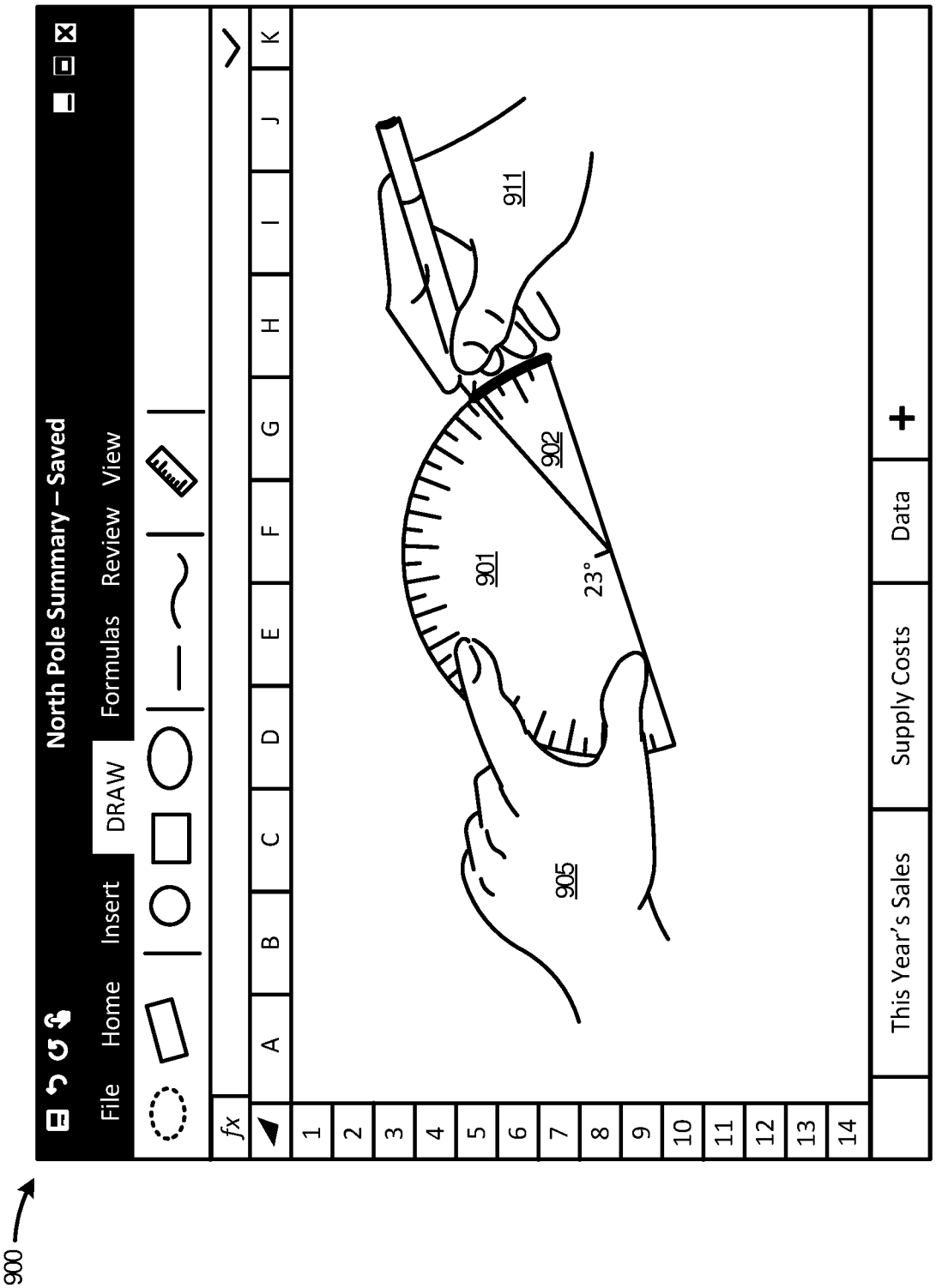

In FIG. 9B, the pen input 901 transitions to pen input 908 in the form of an ark inked along the edge of protector 901. The protector responsively surfaces an indication 902 of the angle being drawn by the pen input 908 (sixty degrees). As the pen input 908 transitions to pen input 909 and the user backtracks along the arc, the indication 902 changes to twenty-five degrees to represent the smaller arc. In FIG. 9D, the user draws the arc even smaller via pen input 911 and the indication 902 changes again (to twenty-three degrees).

Figure 9E:
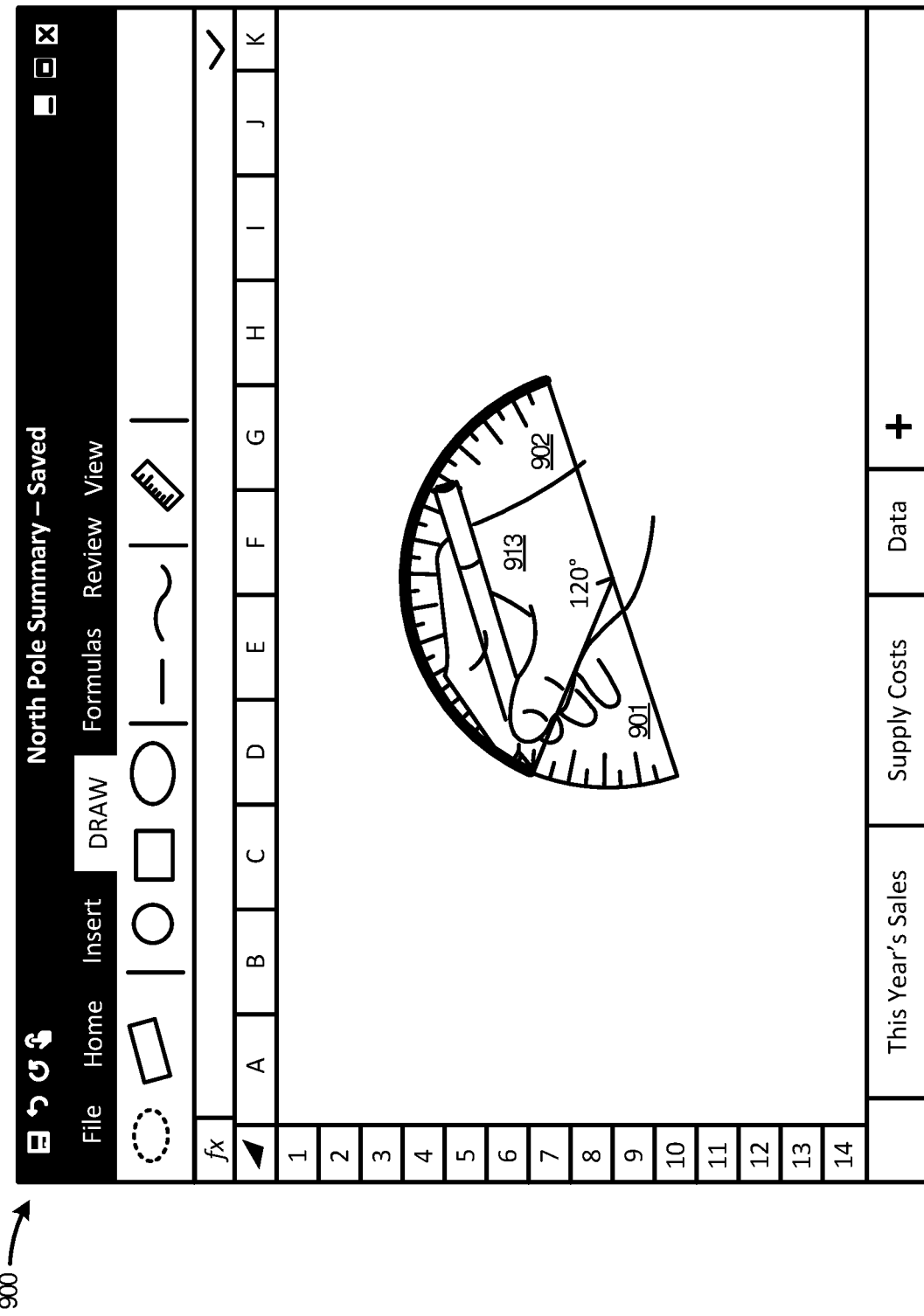
Figure 9F:
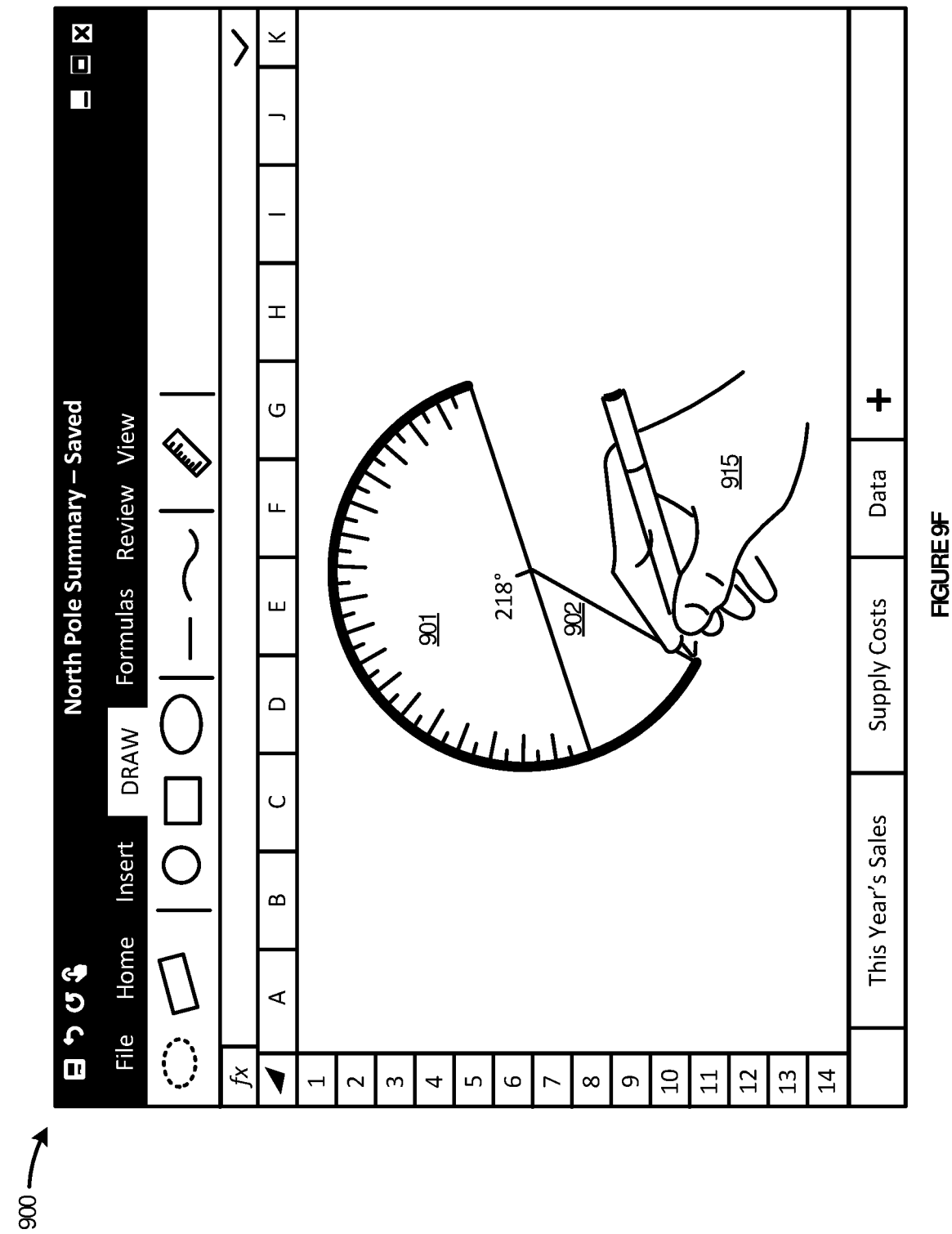

In FIG. 9E, the user expands the arc via pen input 913 and the indication 902 of the angle changes to one-hundred twenty degrees. In FIG. 9F, the user is even able to draw an arc beyond protractor 901 via user input 901 and the protractor 901 is able to track the full angle, displayed by indication 902 as two-hundred eighteen degrees.

FIGS. 10A-10B illustrate an operational scenario whereby inking is drawn selectively based on its position relative to a zone (or zones) associated with a ruler stencil. In FIG. 10A, a ruler stencil 1001 is rendered in a user interface to an application. A user performs inking 1003 in the user interface, possibly way of touch input, digital pen input, mouse input, or any other suitable input. As the ink is supplied, the application communicates the ink points to ruler stencil 1001. Ruler stencil 1001 analyzes the ink points to determine how to draw a wet ink representation of the points, whether to modify the points, or whether to refrain from the drawing the points at all.

If the ink points are on top of the ruler stencil 1001, then the stencil refrains from drawing the points. If the ink points are within a gravity stone of the ruler stencil 1001, then they are drawn as along the edge of the stencil. Otherwise, the ink points can be rendered as supplied by the user input. As a result, in FIG. 10B the ruler stencil 1001 is removed and a void 1005 remains in its place where the ink points where not drawn.

Figure 11A:
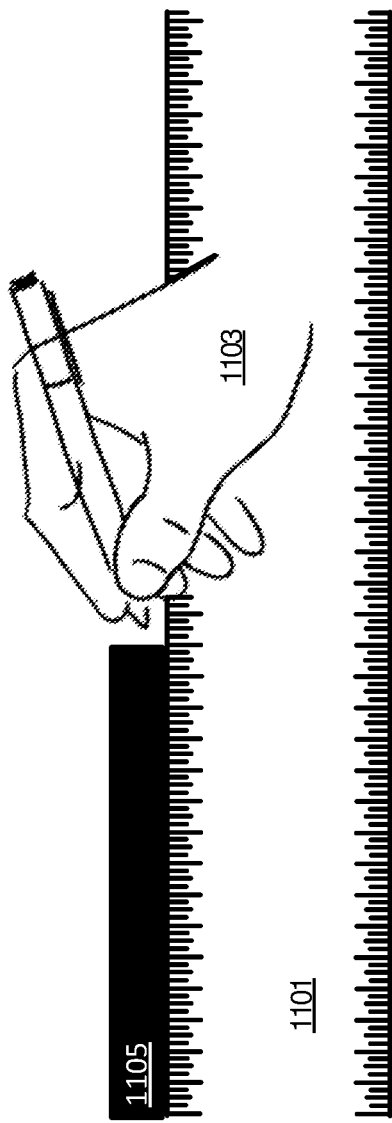
FIG. 11A illustrates an operational scenario in an implementation.
Figure 11B:
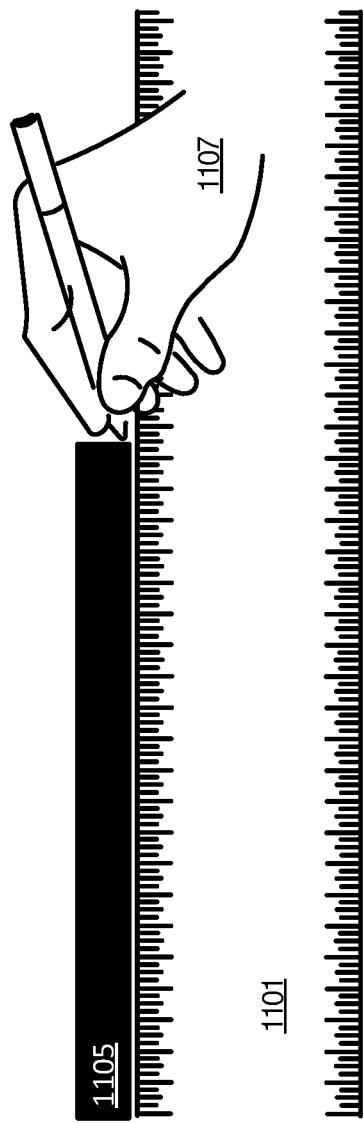
FIG. 11B illustrates an operational scenario in an implementation.

FIGS. 11A-11B illustrate an operational scenario in which a free-form line is modified by a stencil to adhere to an edge of the stencil. FIG. 1A includes a ruler stencil 1101. A user supplies a user input 1103, which in this example is a free-form line drawn against the ruler. To give the effect that the line 1105 can actually be drawn against a ruler, the ruler stencil 1101 examines the ink points associated with the inking to determine whether they are on the ruler, within a zone of the ruler, or outside of the zone.

At first, the line is drawn close to ruler stencil 1101. But in FIG. 11B, the user input 1107 supplied by the user is further away from ruler stencil 1101 than the user input 1103 supplied in FIG. 11A. Rather than draw the line as moving away from the ruler, ruler stencil 1101 interprets the ink points as being positioned within its gravity zone. Since the ink points are within the zone, line 1105 can continue to be drawn against the edge of the ruler, rather than at a distance apart from the ruler.

Referring back to FIG. 4, computing system 401 may be implemented as a single apparatus, system, or device or may be implemented in a distributed manner as multiple apparatuses, systems, or devices. Computing system 401 includes, but is not limited to, processing system 402, storage system 403, software 405, communication interface system 407, and user interface system 409. Processing system 402 is operatively coupled with storage system 403, communication interface system 407, and user interface system 409.

Processing system 402 loads and executes software 405 from storage system 403. Software 405 includes recommendation process 406 which is representative of the processes discussed with respect to the preceding FIGS. 1-6, including process 200. When executed by processing system 402 to enhance color palettes, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise a micro-processor and other circuitry that retrieves and executes software 405 from storage system 403. Processing system 402 may be implemented within a single processing device, but may also be distributed across multiple processing devices or sub-systems that cooperate in executing program instructions. Examples of processing system 402 include general purpose central processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device, but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing a stencil and inking against the stencil, as contemplated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software, in addition to or that include recommendation process 406. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to enhance drawing operations. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

A technical effect of the foregoing implementations is the increased ease with which a user may align shapes, draw free-form lines, or otherwise create drawings in applications. In some implementations, the guide object may reduce the load on a core application process by tracking and reporting its location on a canvas, rather than the core application process having to track the guide object. In other implementations, the guide object may further assist the core application logic by handling where inking is placed on a canvas in support of attempts to hand-draw straight lines (e.g. via a stylus).

Certain inventive aspects may be appreciated from the foregoing disclosure, of which the following are various examples.

Example 1

A computing apparatus comprising: one or more computer readable storage media; a processing system operatively coupled to the one or more computer readable storage media; and an application stored on the one or more computer readable storage media and comprising program instructions that, when executed by the processing system, direct the processing system to at least: render a user interface to the application comprising a canvas and a guide object positioned on the canvas; in response to user input comprising free-form inking on the canvas, determine a position of the user input relative to the guide object on the canvas; if the position of the user input is on the guide object, then refrain from drawing a wet ink representation of the free-form inking on the canvas; and if the position of the user input is within a zone around the guide object, then manipulate the free-form inking such that the wet ink representation of the free-form inking is drawn against an edge of the guide object.

Example 2

The computing apparatus of Example 1 wherein, if the position of the user input is outside of the zone around the guide object and is not on the guide object, then draw the wet ink representation of the inking on the canvas without manipulating the inking.

Example 3

The computing apparatus of Examples 1-2 wherein the user input comprises multiple simultaneous inputs including a dominant hand input and a non-dominant hand input.

Example 4

The computing apparatus of Examples 1-3 wherein the dominant hand input comprises a touch gesture to provide the inking wherein the non-dominant hand input comprises another touch gesture to hold the guide object in place.

Example 5

The computing apparatus of Examples 1-4 wherein the dominant hand input comprises a pen input to provide the inking and the non-dominant hand input comprises a touch gesture to hold the guide object in place.

Example 6

The computing apparatus of Examples 1-5 wherein the guide object comprises a stencil.

Example 7

The computing apparatus of Examples 1-6 wherein the stencil comprises one of a ruler and a protractor.

Example 8

A method comprising: rendering a user interface to an application comprising a canvas and a guide object positioned on the canvas; in response to user input comprising free-form inking on the canvas, determining a position of the user input relative to the guide object on the canvas; if the position of the user input is on the guide object, then refraining from drawing a wet ink representation of the free-form inking on the canvas; and if the position of the user input is within a zone around the guide object, then manipulating the free-form inking such that the wet ink representation of the free-form inking is drawn against an edge of the guide object.

Example 9

The method of Example 8 wherein, if the position of the user input is outside of the zone around the guide object and is not on the guide object, then drawing the wet ink representation of the inking on the canvas without manipulating the inking.

Example 10

The method of Examples 8-9 wherein the user input comprises multiple simultaneous inputs including a dominant hand input and a non-dominant hand input.

Example 11

The method of Examples 8-10 wherein the dominant hand input comprises a touch gesture to provide the inking wherein the non-dominant hand input comprises another touch gesture to hold the guide object in place.

Example 12

The method of Examples 8-11 wherein the dominant hand input comprises a pen input to provide the inking and the non-dominant hand input comprises a touch gesture to hold the guide object in place.

Example 13

The method of Examples 8-12 wherein the guide object comprises a stencil.

Example 14

The method of Examples 8-13 wherein the stencil comprises one of a ruler and a protractor.

Example 15

One or more computer readable storage media having program instructions stored thereon that, when executed by a processing system, direct the processing system to at least: render a user interface to the application comprising a canvas and a guide object positioned on the canvas; in response to user input comprising free-form inking on the canvas, determine a position of the user input relative to the guide object on the canvas; if the position of the user input is on the guide object, then refrain from drawing a wet ink representation of the free-form inking on the canvas; and if the position of the user input is within a zone around the guide object, then manipulate the free-form inking such that the wet ink representation of the free-form inking is drawn against an edge of the guide object.

Example 16

The one or more computer readable media of Example 15 wherein, if the position of the user input is outside of the zone around the guide object and is not on the guide object, then draw the wet ink representation of the inking on the canvas without manipulating the inking.

Example 17

The one or more computer readable media of Examples 15-16 wherein the user input comprises multiple simultaneous inputs including a touch gesture to provide the inking and another touch gesture to hold the guide object in place.

Example 18

The one or more computer readable media of Examples 15-17 wherein the user input comprises multiple simultaneous inputs including a pen input to provide the inking and a touch gesture to hold the guide object in place.

Example 19

The one or more computer readable media of Examples 15-18 wherein the guide object comprises a stencil.

Example 20

The one or more computer readable media of Examples 15-19 wherein the stencil comprises one of a ruler and a protractor.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:
1. A computing apparatus comprising:
one or more computer readable storage media;
a processing system operatively coupled to the one or more computer readable storage media; and
an application stored on the one or more computer readable storage media and comprising program instructions that, when executed by the processing system, direct the processing system to at least:
render a user interface to the application comprising a canvas and a guide object positioned on the canvas;
on a background thread associated with the guide object, determine a location of the guide object on the canvas;
via an application thread and in response to user input comprising free-form inking on the canvas, determine from guidance information provided by the guide object a position of the user input relative to the guide object on the canvas, wherein the guidance information comprises the location of the guide object on the canvas;
when the position of the user input is determined to be on the guide object, then via the application thread, refrain from drawing a wet ink representation of the free-form inking on the canvas; and when the position of the user input is determined to be within a zone around the guide object, then via the application thread, manipulate the free-form inking such that the wet ink representation of the free-form inking is drawn against an edge of the guide object.

2. The computing apparatus of claim 1 wherein, if the position of the user input is outside of the zone around the guide object and is not on the guide object, then draw the wet ink representation of the inking on the canvas without manipulating the inking.

3. The computing apparatus of claim 2 wherein the user input comprises multiple simultaneous inputs including a dominant hand input and a non-dominant hand input.

4. The computing apparatus of claim 3 wherein the dominant hand input comprises a touch gesture to provide the inking wherein the non-dominant hand input comprises another touch gesture to hold the guide object in place.

5. The computing apparatus of claim 3 wherein the dominant hand input comprises a pen input to provide the inking and the non-dominant hand input comprises a touch gesture to hold the guide object in place.

6. The computing apparatus of claim 1 wherein the guide object comprises a stencil.

7. The computing apparatus of claim 6 wherein the stencil comprises one of a ruler and a protractor.

8. A method comprising:
rendering a user interface to an application comprising a canvas and a guide object positioned on the canvas;
on a background thread associated with the guide object, determining a position of the guide object on the canvas;
via an application thread and in response to user input comprising free-form inking on the canvas, determining from guidance information provided by the guide object a position of the user input relative to the guide object on the canvas, wherein the guidance information comprises the location of the guide object on the canvas;
when the position of the user input is determined to be on the guide object, then via the application thread, refraining from drawing a wet ink representation of the free-form inking on the canvas; and
when the position of the user input is determined to be within a zone around the guide object, then via the application thread, manipulating the free-form inking such that the wet ink representation of the free-form inking is drawn against an edge of the guide object.

9. The method of claim 8 wherein, if the position of the user input is outside of the zone around the guide object and is not on the guide object, then drawing the wet ink representation of the inking on the canvas without manipulating the inking.

10. The method of claim 9 wherein the user input comprises multiple simultaneous inputs including a dominant hand input and a non-dominant hand input.

11. The method of claim 10 wherein the dominant hand input comprises a touch gesture to provide the inking wherein the non-dominant hand input comprises another touch gesture to hold the guide object in place.

12. The method of claim 11 wherein the dominant hand input comprises a pen input to provide the inking and the non-dominant hand input comprises a touch gesture to hold the guide object in place.

13. The method of claim 8 wherein the guide object comprises a stencil.

14. The method of claim 13 wherein the stencil comprises one of a ruler and a protractor.

15. One or more computer readable storage media having program instructions stored thereon that, when executed by a processing system, direct the processing system to at least:
render a user interface to the application comprising a canvas and a guide object positioned on the canvas;
on a background thread associated with the guide object, determine a location of the guide object on the canvas;
via an application thread and in response to user input comprising free-form inking on the canvas, determine from guidance information provided by the guide object a position of the user input relative to the guide object on the canvas, wherein the guidance information comprises the location of the guide object on the canvas;
when the position of the user input is determined to be on the guide object, then via the application thread, refrain from drawing a wet ink representation of the free-form inking on the canvas; and
when the position of the user input is determined to be within a zone around the guide object, then via the application thread, manipulate the free-form inking such that the wet ink representation of the free-form inking is drawn against an edge of the guide object.

16. The one or more computer readable media of claim 15 wherein, if the position of the user input is outside of the zone around the guide object and is not on the guide object, then draw the wet ink representation of the inking on the canvas without manipulating the inking.

17. The one or more computer readable media of claim 16 wherein the user input comprises multiple simultaneous inputs including a touch gesture to provide the inking and another touch gesture to hold the guide object in place.

18. The one or more computer readable media of claim 16 wherein the user input comprises multiple simultaneous inputs including a pen input to provide the inking and a touch gesture to hold the guide object in place.

19. The one or more computer readable media of claim 15 wherein the guide object comprises a stencil.

20. The one or more computer readable media of claim 19 wherein the stencil comprises one of a ruler and a protractor.

* * * * *